(12) United States Patent
Barrett

(10) Patent No.: US 10,740,062 B2
(45) Date of Patent: *Aug. 11, 2020

(54) REMOTE STREAMING AUDIO PROCESSING SYSTEM

(71) Applicant: Access Analog, LLC, Longmont, CO (US)

(72) Inventor: Christopher Barrett, Longmont, CO (US)

(73) Assignee: Access Analog, LLC, Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/170,684

(22) Filed: Oct. 25, 2018

(65) Prior Publication Data

US 2019/0065141 A1    Feb. 28, 2019

Related U.S. Application Data

(63) Continuation of application No. 15/370,966, filed on Dec. 6, 2016, now Pat. No. 10,140,087.

(Continued)

(51) Int. Cl.
*G06F 3/048* (2013.01)
*G06F 3/16* (2006.01)
(Continued)

(52) U.S. Cl.
CPC .......... *G06F 3/165* (2013.01); *G06F 3/04847* (2013.01); *H04H 60/04* (2013.01);
(Continued)

(58) Field of Classification Search
CPC ................................. G06F 3/162; G06F 3/165
See application file for complete search history.

(56) References Cited

U.S. PATENT DOCUMENTS

2005/0159832 A1    7/2005  Umeo et al.
2007/0255816 A1   11/2007  Quackenbush et al.
(Continued)

FOREIGN PATENT DOCUMENTS

CA         2887124 C      9/2015

OTHER PUBLICATIONS

Novo-Verde, Tonya, "Office Action Regarding Canadian Patent Application No. 3018513", Apr. 24, 2019, p. 7, Published in: CA.
(Continued)

*Primary Examiner* — Haoshian Shih
(74) *Attorney, Agent, or Firm* — Neugboren O'Dowd PC

(57) ABSTRACT

Methods and systems for processing audio signals include receiving, via an application displayed at a client computing device, an audio signal and a user control input for controlling an audio processing effect of the audio signal. The method may comprise sending the audio signal and the user control input to an audio server and then relaying the audio signal through the audio server to an input of an audio processing device. The method may also comprise controlling a setting on the audio processing device through a hardware controller based on the user control input, and returning a processed version of the audio signal from the audio processing device to the client computing device. The method may comprise adding an identifying signal between samples of an unprocessed version of the audio signal and initiating playback based on the identifying signal.

21 Claims, 25 Drawing Sheets

Related U.S. Application Data

(60) Provisional application No. 62/311,285, filed on Mar. 21, 2016.

(51) Int. Cl.

| | | |
|---|---|---|
| *G06F 3/0484* | (2013.01) | |
| *H04H 60/04* | (2008.01) | |
| *G06F 3/0481* | (2013.01) | |
| *H04L 12/28* | (2006.01) | |

(52) U.S. Cl.
CPC ............ *G06F 3/0481* (2013.01); *G06F 3/162* (2013.01); *H04L 12/2854* (2013.01)

(56) References Cited

U.S. PATENT DOCUMENTS

| | | |
|---|---|---|
| 2012/0004937 A1 | 1/2012 | Mohamed et al. |
| 2014/0012907 A1 | 1/2014 | Cavanaugh et al. |
| 2014/0160297 A1 | 6/2014 | Dondurur et al. |
| 2014/0334644 A1 | 11/2014 | Selig et al. |
| 2015/0062429 A1 | 3/2015 | Barbulescu et al. |
| 2015/0127340 A1 | 5/2015 | Epshteyn et al. |
| 2015/0229534 A1 | 8/2015 | Tsinberg et al. |

OTHER PUBLICATIONS

Osler, Hoskin & Harcourt LLP, "Response to Office Action Regarding Canadian Patent Application No. 3018513", dated Apr. 11, 2019, p. 4, Published in: CA.

Novo-Verde, Tanya, "Office Action Regarding CA Patent Application No. 3,018,513", dated Oct. 12, 2018, No. 6, Published in: CA.

Lowenberger, Aaron, "Final Office Action Regarding U.S. Appl. No. 15/370,966", Aug. 8, 2017, p. 64, Published in: US.

Lowenberger, Aaron, "Office Action Regarding U.S. Appl. No. 15/370,966", dated Feb. 15, 2017, p. 51, Published in: US.

Otero, Vanessa, "Response to Office Action Regarding U.S. Appl. No. 15/370,966", dated Apr. 25, 2017, p. 14, Published in: US.

Otero, Vanessa, "Response to Office Action Regarding U.S. Appl. No. 15/370,966", dated Oct. 6, 2017, p. 14, Published in: US.

Wittman-Regis, Agnes, "International Premlimary Report on Patentability Re International App. No. PCT/US2017/023018", dated Oct. 4, 2018, Published in: WO.

Hayes, Gail, "International Search Report and Written Opinion Re Application No. PCT/US17/23018", dated May 18, 2017, p. 21, Published in: US.

The Audio Hunt, Inc., "How the Audio Hunt Works", "Retrieved from https://www.theaudiohunt.com/how-it-works", Mar. 15, 2017, p. 7.

Novo-Verde, Tanya, "Office Action Regarding Canadian Patent Application No. 3,018,513", dated Jan. 2, 2020, p. 6, Published in: CA.

Coenen, Jean Pierre, "Extended Search Report and Written Opinion Regarding European Application No. 17770866.6", Feb. 17, 2020, p. 12, Published in: EU.

Shinde et al., "Automation of Electricity Billing Process", "2014 International Conference on Power, Automation and Communication (INPAC)", Oct. 6, 2014, pp. 18-21, Publisher: IEEE.

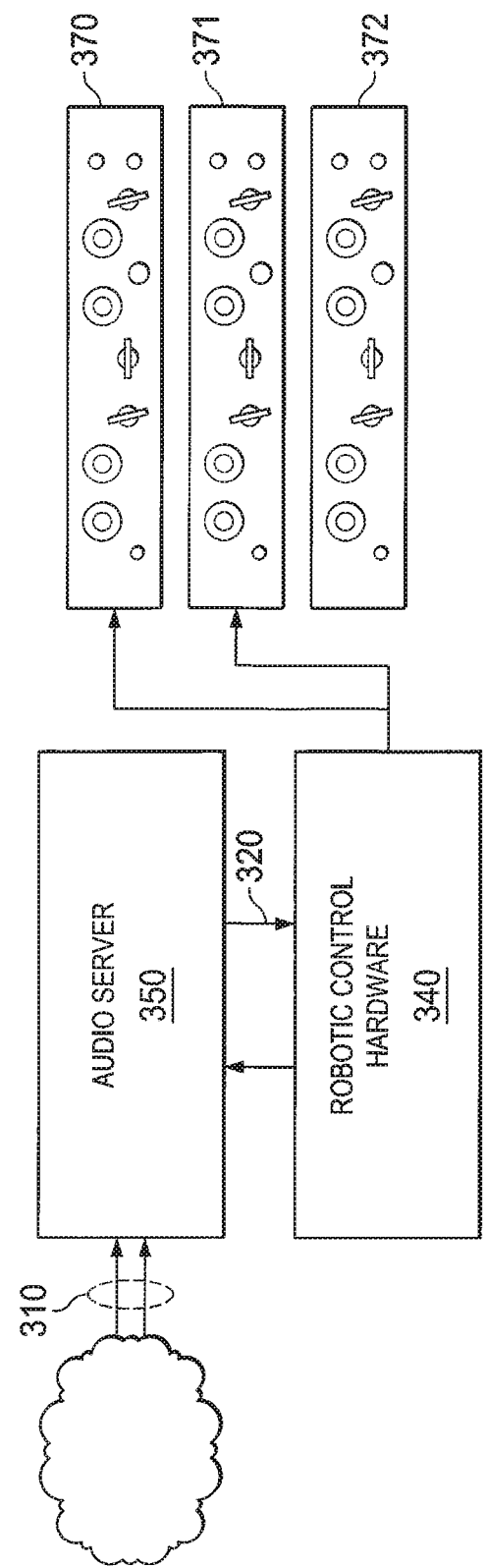

MAIN TABLE (605A)

| EQUIP ID | EQUIP MANUFACTURER | EQUIP TYPE | #CHANNELS | CTRL DEVICE | CTRL ADDRESS | A/D DEVICE | A/D OUT PORT | A/D IN PORT | SCHEDULE | PARAMETERS | IN USE? |
|---|---|---|---|---|---|---|---|---|---|---|---|
| 0 | ACME 1 | ClassicEQ | 1 | /dev/cumodmem1 | 4 | ORION 1 | 1 | 1 | TABLE 2 | TABLE A | YES |
| 1 | ACME 2 | ClassicComp | 1 | /dev/cumodmem1 | 5 | ORION 1 | 2 | 2 | TABLE 3 | TABLE B | NO |
| 2 | ACME 3 | Model100 | 2 | /dev/cumodmem2 | 6 | ORION 2 | 3/4 | 3/4 | TABLE 4 | TABLE C | NO |

611A, 612A, 613A → rows; 620A, 630A → columns

TABLE A

| PARAMETER ID | LOWER PWM | UPPER PWM |
|---|---|---|
| 0 | 800 | 2200 |
| 1 | 780 | 1100 |
| 2 | 1000 | 2000 |
| 3 | 770 | 2250 |

TABLE B

| PARAMETER ID | LOWER PWM | UPPER PWM |
|---|---|---|
| 0 | 800 | 2200 |
| 1 | 780 | 1100 |
| 2 | 1000 | 2000 |
| 3 | 770 | 2250 |

TABLE C

| PARAMETER ID | LOWER PWM | UPPER PWM |
|---|---|---|
| 0 | 800 | 2200 |
| 1 | 780 | 1100 |
| 2 | 1000 | 2000 |

TABLE 2 (640A)

| START TIME | END TIME | USER ID |
|---|---|---|
| 3/4/2016 12:00:00 | 3/4/2016 18:00:00 | 5 |
| 3/5/2016 8:00:00 | 3/8/2016 8:00:00 | 17 |

TABLE 3

| START TIME | END TIME | USER ID |
|---|---|---|

TABLE 4 (650A)

| START TIME | END TIME | USER ID |
|---|---|---|
| 3/3/2016 13:00:00 | 3/4/2016 18:00:00 | 22 |

FIG. 6A

PARAMETER DATABASE

| EQUIP ID | EQUIP MANUFACTURER | EQUIP TYPE | #CHANNELS | CTRL DEVICE | CTRL ADDRESS | A/D DEVICE | A/D OUT PORT | A/D IN PORT | SCHEDULE | PARAMETERS | IN USE? |
|---|---|---|---|---|---|---|---|---|---|---|---|
| 0 | ACME 1 | ClassicEQ | 1 | /dev/cumodmem1 | 4 | ORION 1 | 1 | 1 | TABLE 2 | TABLE A | YES |
| 1 | ACME 2 | ClassicComp | 1 | /dev/cumodmem1 | 5 | ORION 1 | 2 | 2 | TABLE 3 | TABLE B | NO |
| 2 | ACME 3 | Model100 | 2 | /dev/cumodmem2 | 6 | ORION 2 | 3/4 | 3/4 | TABLE 4 | TABLE C | NO |

SCHEDULE DATABASE

| EQUIP ID | EQUIP MANUFACTURER | EQUIP TYPE | SCHEDULE |
|---|---|---|---|
| 0 | ACME 1 | ClassicEQ | TABLE 2 |
| 1 | ACME 2 | ClassicComp | TABLE 3 |
| 2 | ACME 3 | Model100 | TABLE 4 |

TABLE 2

| START TIME | END TIME | USER ID |
|---|---|---|
| 3/4/2016 12:00:00 | 3/4/2016 18:00:00 | 5 |
| 3/5/2016 8:00:00 | 3/8/2016 8:00:00 | 17 |

TABLE 3

| START TIME | END TIME | USER ID |
|---|---|---|

TABLE 4

| START TIME | END TIME | USER ID |
|---|---|---|
| 3/3/2016 13:00:00 | 3/4/2016 18:00:00 | 22 |

TABLE A

| PARAMETER ID | LOWER PWM | UPPER PWM |
|---|---|---|
| 0 | 800 | 2200 |
| 1 | 780 | 1100 |
| 2 | 1000 | 2000 |

TABLE B

| PARAMETER ID | LOWER PWM | UPPER PWM |
|---|---|---|
| 0 | 800 | 2200 |
| 1 | 780 | 1100 |
| 2 | 1000 | 2000 |

TABLE C

| PARAMETER ID | LOWER PWM | UPPER PWM |
|---|---|---|
| 0 | 800 | 2200 |
| 1 | 780 | 1100 |
| 2 | 1000 | 2000 |

REMOTE STREAMING AUDIO PROCESSING SYSTEM

PRIORITY

This application is a continuation of U.S. patent application Ser. No. 15/370,966 filed Dec. 6, 2016 and entitled "REMOTE STREAMING AUDIO PROCESSING SYSTEM", which claims priority to U.S. Provisional Application No. 62/311,285 entitled "REMOTE STREAMING AUDIO PROCESSING SYSTEM", filed Mar. 21, 2016, and assigned to the assignee hereof and hereby expressly incorporated by reference herein.

FIELD OF THE DISCLOSURE

The present disclosure relates generally to audio processing. More specifically, but without limitation, the present disclosure relates to a system for using audio processing equipment in real-time from a remote location.

BACKGROUND OF THE DISCLOSURE

Musicians in recording studios have many options for audio processing equipment through what are known as "rack mount" audio processors. Typically, a musician can plug any audio source, such as a recorded audio track, or even a single electric instrument, through a standard line level output cable, into a rack mount audio processor in order to alter the original audio of the recorded track or the live-played instrumental music in some way. The musician or producer can manipulate manual knobs, switches, and buttons to achieve a particular sound. Such equipment is often highly precise in terms of the specificity of sound that the musician wants. As a result, rack mount audio processors can be very expensive, varying from hundreds to thousands of dollars. There are limited options for replicating such sounds for musicians who do not have access to state-of-the-art recording studios, and who cannot afford such equipment. One option is to rent recording studio space hourly, but well-equipped recording studios are not widely available for rent. Another option is to use software plugin simulators available on music recording software programs to approximate the desired sound. Although such plugins have become fairly advanced, there is a noticeable difference in the fidelity of the desired sound between a real hardware audio processor and its software plugin version. Therefore, a need exists to make real rack mount audio processing sound quality more accessible to musicians.

SUMMARY

One aspect of the disclosure provides a method for processing audio signals. The method may comprise receiving, via an application displayed at a client computing device, an audio signal and a user control input for controlling an audio processing effect of the audio signal. Then, the method may comprise sending the audio signal and the user control input to an audio server and then relaying the audio signal through the audio server to an input of an audio processing device. The method may also comprise controlling a setting on the audio processing device through a hardware controller based on the user control input, and returning a processed version of the audio signal from the audio processing device to the client computing device. The method may further comprise initiating playback of an unprocessed version of the audio signal during a time period between the sending of the audio signal to the audio server and the returning of the processed version of the audio signal, adding an identifying signal in between samples of the unprocessed version of the audio signal, locating a first sample after the identifying signal in the processed version of the audio signal, discarding the identifying signal prior to playback of the processed version of the audio signal, terminating the playback of the unprocessed version of the audio signal, and initiating the playback of the processed version of the audio signal, wherein the terminating and the initiating are based on the locating of the first sample after the identifying signal.

Another aspect of the disclosure provides a method for remotely using audio processing devices. The method may comprise presenting, to a user, at a client computing device, an equipment selection interface configured to allow the user to select one of a plurality of remote processing devices, and receiving, via an application displayed at the client computing device, an audio signal and a user control input for controlling an audio processing effect of the audio signal. The method may also comprise sending the audio signal and the user control input to an audio server and relaying the audio signal through the audio server to an input of a selected audio processing device. The method may further comprise controlling a setting on the selected audio processing device through a hardware controller based on the user control input, and returning a processed version of the audio signal from the selected audio processing device to the client computing device. The method may further comprise initiating playback of an unprocessed version of the audio signal during a time period between the sending of the audio signal to the audio server and the returning of the processed version of the audio signal, adding an identifying signal in between samples of the unprocessed version of the audio signal, locating a first sample after the identifying signal in the processed version of the audio signal, discarding the identifying signal prior to playback of the processed version of the audio signal, terminating the playback of the unprocessed version of the audio signal, and initiating the playback of the processed version of the audio signal, wherein the terminating and the initiating are based on the locating of the first sample after the identifying signal.

Yet another aspect of the disclosure provides a system for remote access to an audio processing device. The system may comprise an audio server configured to receive, via an application displayed at a client computing device, an audio signal and a user control input for controlling an audio processing effect of the audio signal; send the audio signal and the user control input to an audio server; relay the audio signal through the audio server to an input of an audio processing device; control a setting on the audio processing device through a hardware controller based on the user control input; and return a processed version of the audio signal from the audio processing device to the client computing device. The system may be configured to initiate playback of an unprocessed version of the audio signal during a time period between the sending of the audio signal to the audio server and the returning of the processed version of the audio signal, add an identifying signal in between samples of the unprocessed version of the audio signal, locate a first sample after the identifying signal in the processed version of the audio signal, discard the identifying signal prior to playback of the processed version of the audio signal, terminate the playback of the unprocessed version of the audio signal, and initiate the playback of the processed version of the audio signal, wherein the terminating and the initiating are based on the locating of the first sample after the identifying signal. The system may also comprise a web server configured to present, to a user, at the client computing device, an equipment selection interface configured to allow the user to reserve the audio processing device; and schedule a time reserved by the user for using the audio processing device.

BRIEF DESCRIPTION OF THE DRAWINGS

FIG. 3 depicts how control signals travel through robotic control hardware to audio processors according to the present disclosure.

FIG. 6A shows an embodiment of a database table of the present disclosure.

FIG. 6B shows another embodiment of a database table of the present disclosure.

FIG. 12D shows an exemplary graphical user interface for scheduling functionality.

DETAILED DESCRIPTION

Figure 1A:
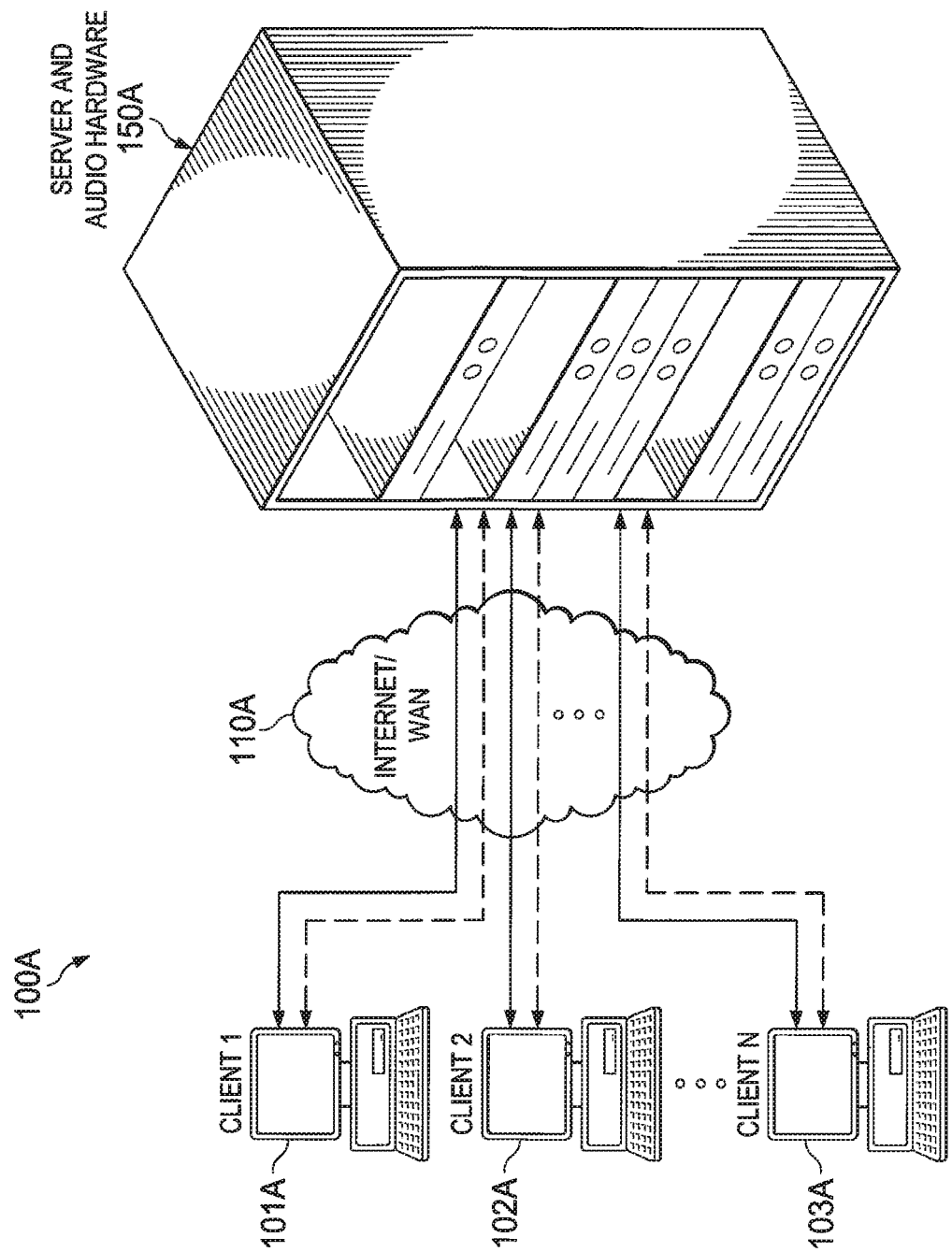
FIG. 1A is a high-level diagram of a system of the present disclosure.
Figure 1B:
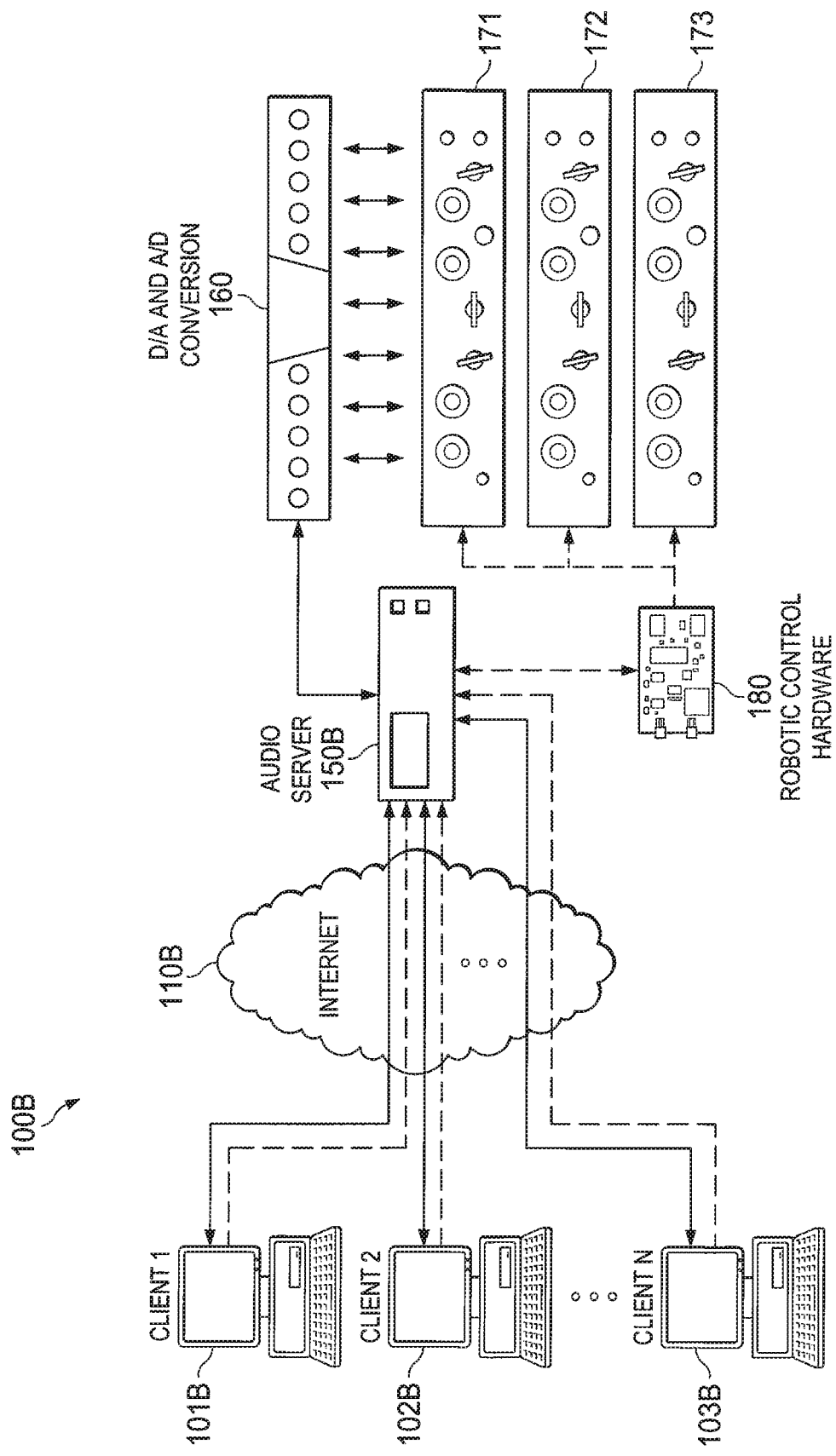
FIG. 1B shows a high-level diagram of the system depicted in FIG. 1A, depicting additional detail regarding an audio server and various hardware devices used to implement aspects of the present disclosure.

The present disclosure provides a system that allows one or more users (which may also be referred to as a client or clients) to remotely access audio hardware through a remote audio server at the same location as the audio hardware. The client(s) and audio server may be at different geographic locations and connected via a Wide Area Network (WAN). FIG. 1A shows a high-level system 100A overview in which several clients 101A-103A send audio signals through a WAN (such as the Internet) 110A to a server and audio hardware processing devices 150A in a remote location. The system 100B, which is depicted in FIG. 1B, shows the server and hardware components of the system in greater detail. Each client, such as client 101B, may send source audio material through a WAN 110B to the audio server 150B, which sends the audio to be processed by one or more hardware audio processors 171-173 that is local to the audio server 150 location. It is contemplated that many different clients may use the hardware audio processors, as indicated by clients 1-N (101B-103B) in FIG. 1B. The clients may access and control the hardware audio processors through a web server and a database server, both of which will be described in further detail later in the disclosure. For clarity, each type of server will be specified throughout the disclosure as a web server, database server, or audio server.

It is also contemplated that many kinds of hardware audio processors may be utilized in the system. In some embodiments, one client may use one or more processors at a time, but in other embodiments, it is possible that more than one client may use one or more processors at a time. After processing, the audio server 150B may return the processed audio material to the client 101B via the WAN 110B. These steps may be performed on small chunks of audio data that are streamed between client 101B and server 150B. In this form, the processing is done in real time such that the client can hear the processed audio as the audio is being returned from the server. The hardware processors 171-173 may employ knobs, switches, buttons, etc. to allow control over the audio processing at any given point in time. To allow the client 101B access to this control in real time, the client 101B can manipulate software representations of these controls (referring briefly to FIG. 12A) as part of a virtual control panel 1210 on a graphical user interface (GUI) at the client's computer. The changes in these software controls may send a control message to the audio server 150B whenever the software representation is changed by the user. These control messages may be received and interpreted by the audio server 150, which then uses robotic control hardware 180 to cause the physical hardware controls of the audio processing devices 171-173 to move in accordance with the client messages and duplicate the desired control position of the virtual control panel 1210.

The client may be implemented by a computer capable of storing and retrieving audio material. The storing and retrieving may be implemented through a dedicated application that is specifically designed to receive audio input through a computer and communicate it to the server, or it may be implemented by a third party application (such as a music recording software program) that allows the use of plugins. In the latter case, the audio plugin format can be used to accept a stream of audio data from the third-party application. The audio plugin can then send that stream of audio data to the remote server as described above, instead of locally processing the audio data through software at the client's computer as done in the prior art. After processing, the server may return the audio data to the plugin which then returns the processed audio data to the third-party application. Existing audio plugin formats commonly have a GUI as well which can be used to implement the control system outlined above, as depicted by the plugin GUI 1200 in FIG. 12. For the purposes of the present disclosure, the term "plugin" may be used to describe a customized application that works in conjunction with the system, or a third-party application, and may also refer to the plugin GUI (e.g., plugin GUI 1200) itself of either kind of application that a client may interact with.

Figure 2:
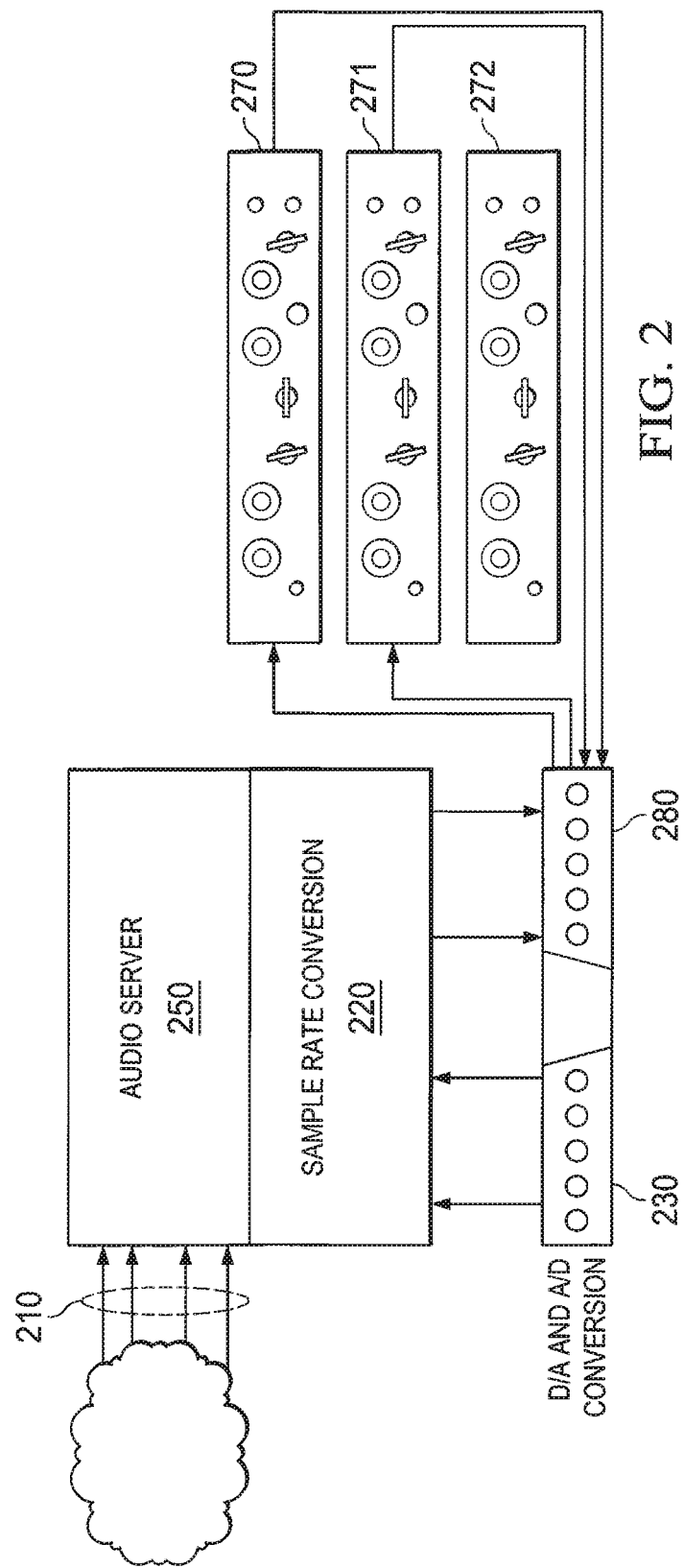
FIG. 2 depicts how input and output audio signals travel through a server, sample rate converter, D/A and A/D converter, and audio processors of the present disclosure.

The audio server may provide a network interface that allows a client to establish a data connection via a web server. The initial connection can be used to authenticate the client via the web server (which will be described in further detail with reference to FIG. 4) and start both audio and control connections. FIG. 2 shows the flow of the audio data alone, and FIG. 3 shows the flow of the robotic control data. As shown in FIG. 2, the audio server computer 250 may be able to receive the digital audio data through an input 210 and send it out through an output 220, passing through a sample rate converter 240 to a digital to analog (D/A) converter 230, which converts the digital audio data to an analog format that can be processed by a hardware audio processor. The resulting analog audio data is then passed through one or more hardware audio processors 270-272 and returned to an analog to digital (A/D) converter 280. In many embodiments, the D/A converter 230 and the A/D converter 280 may be implemented by the same machine. Once the A/D converter 280 converts the analog signal into digital, it may then send the digital audio data back to the audio server 250, which may then send the digital audio data back to the originating client computer.

FIG. 3 shows that the audio server 350 may also be configured to receive client control messages concurrently with the digital audio data. The audio server 350 may receive the control messages through an input 310 and relay them through an output 320, which may comprise a USB, FireWire, Thunderbolt, or other peripheral bus port. These messages may then be translated into commands to a robotic control hardware mechanism 340. The robotic hardware 340 may then physically set the knobs, switches, and buttons of the hardware audio processors 370-372 according to the commands received via the control signals.

Figure 4A:
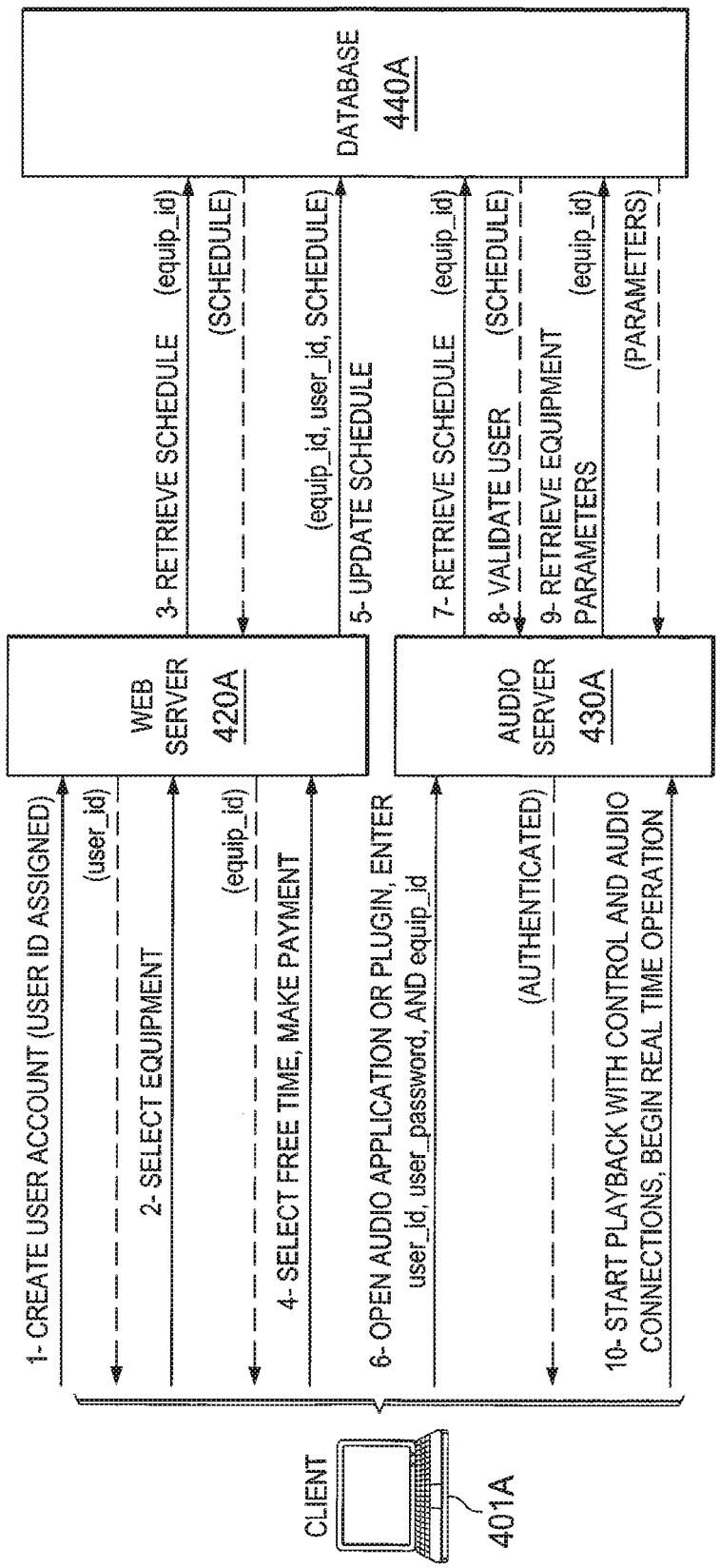
FIG. 4A is a timing diagram of methods of authenticating, scheduling, and remotely using audio hardware equipment according to the present disclosure.
Figure 4B:
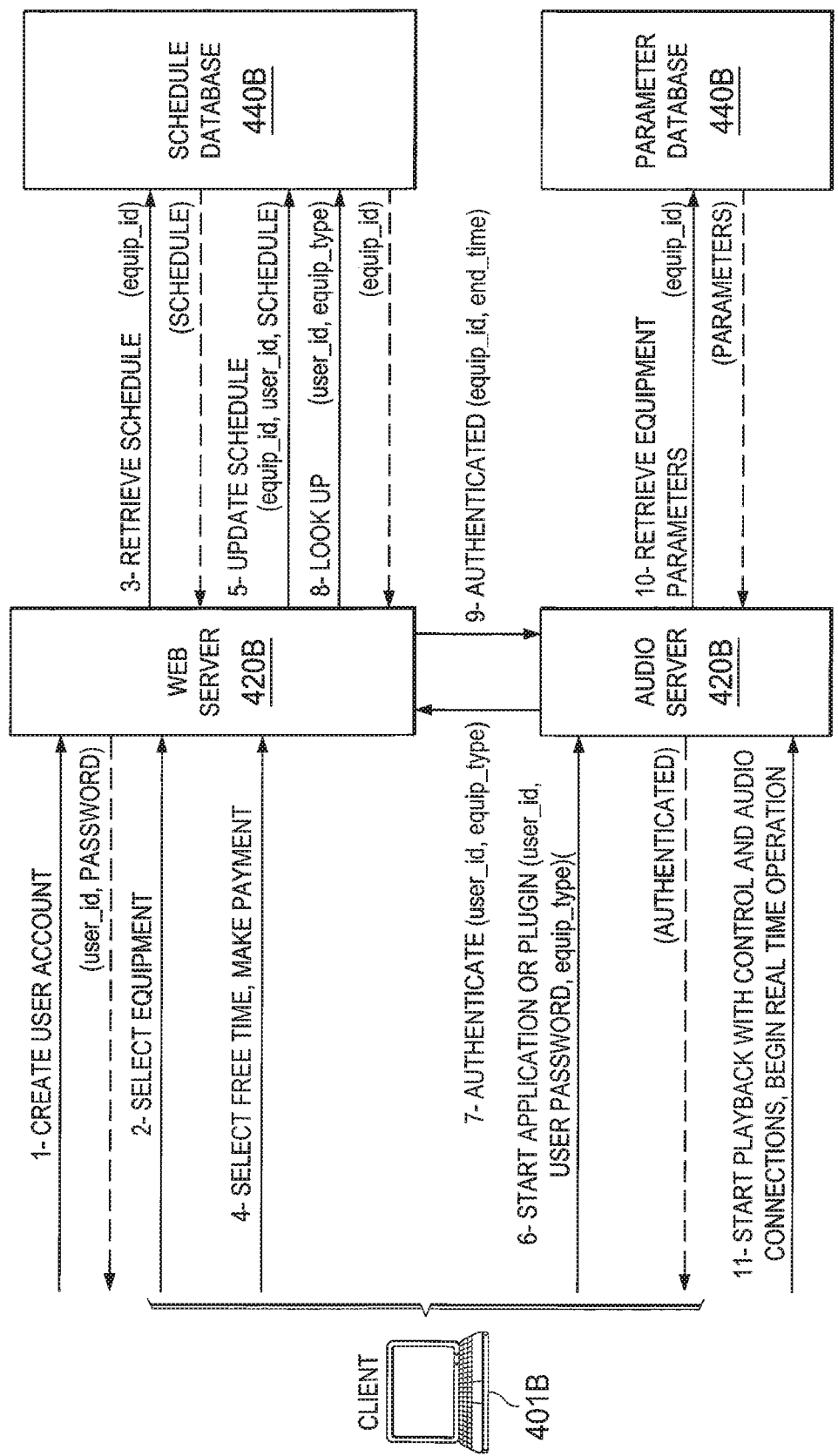
FIG. 4B is a timing diagram of another embodiment of methods of authenticating, scheduling and remotely using audio hardware equipment according to the present disclosure.

FIGS. 4A and 4B are logical block diagrams that depicts the flow of information between the client and the three types of servers described in this disclosure. The steps of a representative method of the disclosure are labeled as steps 1-10 in each Figure, but are not necessarily limited to the order presented herein. FIG. 4A shows an embodiment where there is one system database and it is accessed by both the web server and audio server. The client 401A may be authenticated by and interact with the web server 420A in order to create a user account (with a user ID) at step 1A, select the desired hardware equipment and receive an equipment ID at step 2, schedule a session when the desired hardware equipment is available, and make a payment at step 4. The web server 420A may be implemented by a customized and integral web server or by a commercially-available third party server. As shown in FIG. 4A, the client 40A1 may interact separately with both the web server 420A and the audio server 430A. The client may interact with the audio server 430A to open the audio application or plugin at step 6, enter a user ID and equipment ID, also at step 6, and then to open control and audio connections and begin real-time operation at step 9. Each of the web server 420A and the audio server 430A may further interact with a database implemented in a database server 440A. In FIG. 4A, the database 440A is shown as a single database with which both the web server 420A and the audio server 430A independently interact. Though the database server 440A is shown separately from the audio and web servers, in some embodiments it may be implemented in the same hardware and/or software as the audio server 430A and/or the web server 420A. In order to provide its functionality to the client, the web server 420A may retrieve a database schedule (also referred to herein as "schedule data") for the hardware equipment from the database server 440A at step 3. The web server 420A may also update the schedule in the database with the client's user ID at step 5. Details of the database will be discussed in further detail with reference to FIG. 6A. The audio server 430A may interact with the database server 440A in order to retrieve the database schedule at step 7, validate a client's user ID and equipment ID at step 8, and retrieve hardware equipment parameters at step 9.

Before turning to FIG. 4B, which shows an alternative embodiment of a system and method for authentication, we turn to FIG. 6A to show an embodiment of a database that may be used in the authentication method of FIG. 4A. The database 600 contains a primary table (also known as a "main" table) 605A that has a unique row 611A, 612A, 613A for each piece of audio hardware equipment. For each piece of equipment the table lists parameters in parameter column 620A that might vary between instances of audio hardware equipment. These varying parameters will be described in more detail presently. The content of the columns of each row will be described from left to right. The equipment ID column contains a unique identifying number given to each piece of equipment. The equipment manufacturer column identifies the company that produces the equipment. The equipment type column indicates the equipment model number or other identifying indicator that the manufacture has assigned to the equipment. In some cases, there may be several pieces of audio hardware of the same model for a user to choose from. In order to differentiate these individual pieces of equipment, there is both an "equipment type" field and "equipment ID" field. The number of channels column shows the maximum number of audio channels that the equipment can process at the same time. The control device and control address columns identify which robotic hardware ports are attached to the equipment front panel controls. The A/D device and port columns show which A/D converter ports are attached to the equipment audio inputs and outputs. The schedule data column 630A is a reference to a "schedule sub-table" 640A that would contain the time periods where the equipment is reserved by a client. The schedule sub-table 640A uses start time, end time, and user id to uniquely identify the reserved time periods. The parameters column 620A is a reference to a "parameter sub-table" 650A where the list of equipment front panel controls are stored along with the robotic information needed to properly manipulate that control. As shown, the parameter sub-table 650A has a parameter ID column, which may indicate a servo motor setting or other robotic parameter.

Turning back to FIG. 4B, shown is an embodiment where the database information might be split up between multiple database instances. In such an implementation, there may be both a scheduling database 445B and a parameter database 455B. In contrast to FIG. 4A, the web server 420B and audio server 430B interact with the scheduling database 445B and parameter database 455B separately, and communicate some information between the servers. In this case, the schedule database 445B may contain all scheduling information for all equipment. The parameter database 455B may contain all data specific to each piece audio hardware equipment (e.g. the number and type of knobs and controls, among other items). The client interactions with the web server 420B and audio server 430B would remain the same as the system shown in FIG. 4A. When the client requests authentication in step 6, the audio server 430B would forward the request to the web server 420B in step 7. The web server 420B would authenticate the user based on the stored schedule data in step 8 and return the authentication indication to the audio server 430B in step 9. The audio server 430B would then obtain the hardware parameters from the parameter database in step 10 and the client would start real time operation in step 11. Having separate, but somewhat overlapping databases at both the web server 420B and the audio server 430B may provide several advantages. For example, web servers that contain databases are often difficult to access from external servers for security reasons. As a result, it may not be efficient to store all the information about the audio hardware equipment at the web server 420B. Such information may be most efficiently stored at the audio server 430B itself. Conversely, it may be inefficient to store all scheduling information at the audio server 430B, because then the web server 420B would have to retrieve schedule information from the audio server every time a user tried to schedule a session through the web server 420B. Therefore, it is advantageous for the web server 420B to be able to store the scheduling database itself and just send scheduling information out to the audio server 430B.

FIG. 6B shows how the schedule and parameter databases in FIG. 4B might be implemented. In contrast to FIG. 6A, there are two separate databases; a parameter database 610B and a schedule database 615B, rather than just a main table 605A in FIG. 6A. The overall content of each of the databases matches the database content in FIG. 6A. However, the equipment ID information is duplicated between the databases to allow the respective rows in schedule database 615B and parameter database 610B to be coordinated. As long as the messages between the audio and web servers use the equipment ID, the data used from the databases can be kept in sync. In implementation, when the web server 420B in FIG. 4B sends the message to the audio server 430B that the user is authenticated, in step 9, the web server sends the equipment ID as an identifying piece of information.

Figure 5:
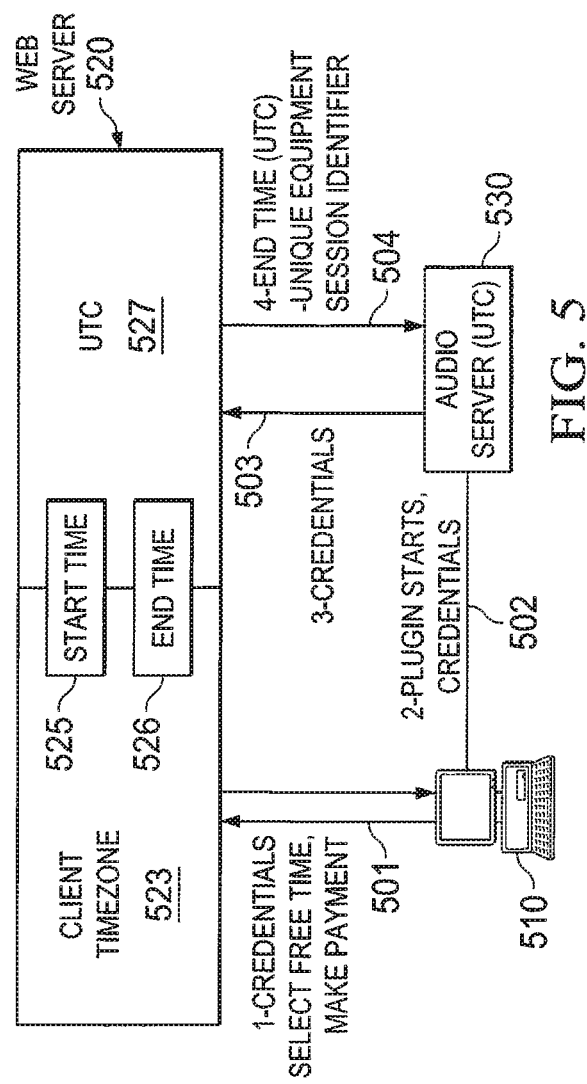
FIG. 5 shows how servers of the present disclosure may coordinate to schedule usage of audio processing equipment.

Turning now to FIG. 5, shown is a diagram of a particular aspect of the interaction between the web server and the audio server (e.g., the web server 420A and audio server 430A of FIG. 4A). Specifically, FIG. 5 shows how the scheduling of the use of audio hardware equipment may be accomplished while accommodating multiple users in different time zones, and allow conflict-free scheduling of the audio hardware regardless of whether any user is located in the same or different time zone as the audio server and hardware. As shown in FIG. 5, the client 510 may first communicate with the web server 520 at step 501, wherein the client 510 sets up or logs in with credentials, selects the free time available for selected audio equipment, and makes payment. During step 501, the client interacts with the web server 523 with reference to the client's local time zone, shown as a client time zone interface 523 of the web server 520. The web server 520 also has a UTC (Universal Time Code) interface 527 that is not necessarily visible to the client 510. The web server 520 may comprise logic for converting a start time 525 and an end time 526 of a user's selected time period between the client time zone 523 and the UTC 527.

From the client's perspective, the second step after step 501 is to start the plugin with the client's credentials (e.g., a user ID and equipment ID) at step 502. As previously discussed, the client's launch of a plugin initiates communication with the audio server 530. The audio server's 530 internal time may be set to UTC so that it may accurately coordinate with the UTC interface 527 of the web server 520. The audio server 530 may send the user's credentials to the web server 520 at step 503, and the web server 520 may then send the user's start and end time to the audio server at step 504. Because the web server 520 and the audio server 530 both associate the user's credentials with a start and end time that is in UTC (due to the fact that the web server 520 has converted the client's time zone start and end time to a UTC start and end time), the time scheduled by the user through the web server 520 will accurately correspond to a time available on the audio server 530. The communication method described in FIG. 5 facilitates the authentication methods shown in FIGS. 4A and 4B, because the authentication methods must use a common time base for scheduling data. At the same time, the communication method of FIG. 5 allows the client to utilize the client's own time zone when interacting with the web server. To accommodate this, the system can present scheduling data in step 4 (FIG. 4A or 4B) in the client time zone. However, in the rest of the system, the schedule data can be communicated in a common time base such as Coordinate Universal Time (UTC) which is based on Greenwich Mean Time. Thus, the web server could perform the translation from client time zone to UTC when required to translate between the client and the backend database.

Figure 8:
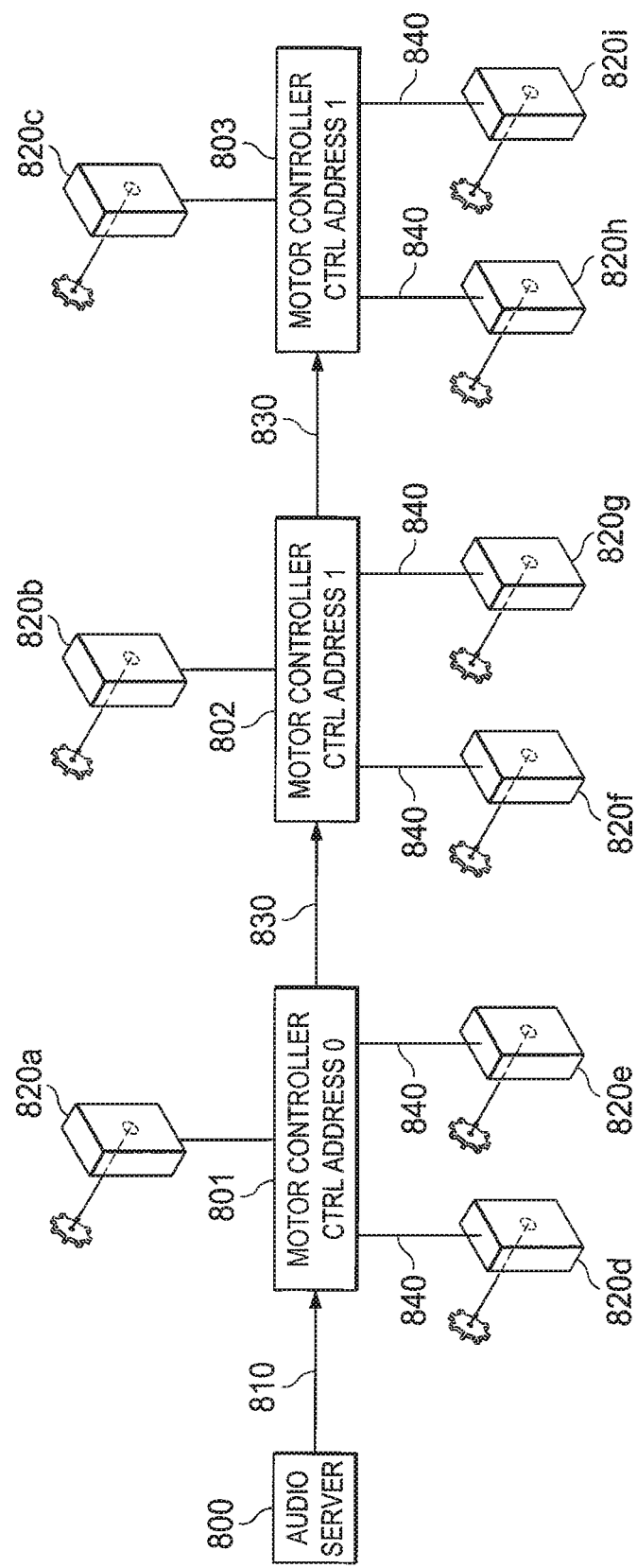
FIG. 8 shows how several robotic controllers may be connected together to control multiple physical knobs and buttons in an embodiment of the present disclosure.

As will be discussed later in this disclosure, each motor controller may support one or more different channels that control the various knobs and switches on a hardware device. In some embodiments, multiple motor controllers may be daisy-chained, while in others, multiple computer ports may be used at the server to connect multiple motor controllers. Referring briefly to FIG. 8, in daisy chain configurations, the sequence of control signals may be sent through these components in the following order: audio server 800, USB 810, motor controller 801, motor controller 802, motor controller 803, and on to other motor controller (s) N (not shown) as needed. In these configurations, each motor controller must have an address, which are stored in the next column of the Main Table 651 entitled "Ctrl Address." This column contains the address of the motor controller that serves the motors connected to the specific piece of hardware equipment. In embodiments wherein multiple ports are used to connect multiple controllers, the "Ctrl Address" field may reflect which port or motor is used directly. Still referring to FIG. 6B, the next column is A/D device, which contains an identifier for the audio server software that indicates which A/D device the specific equipment is connected to in cases where multiple A/D boxes are attached to a single audio server via multiple peripheral bus ports. The next column is A/D out port or A/D in port, which specifies particular ports that the equipment is connected to.

In both of the databases illustrated in FIGS. 5A and 5B, there is a schedule column, to which the web server may read and write. The schedule columns reference the sub-tables 540A, 540B, which include Table 2, Table 3, Table 4, etc. Sub-tables 540A, 540B contain listings of start and end time for occupied time slots. These sub-tables may also contain a user ID that identifies which unique user is occupying a particular time slot. One important aspect of the functionality of the web server is provided through this schedule data; the web server may read this schedule data and then display it on a user-facing webpage so that the user can choose a free time slot. The web server may also then write data to the schedule column to indicate that the user has selected and paid. The audio server may then read this schedule data when it is contacted by the plugin for authentication. The plugin may send a user ID and equipment ID when it initially contacts the audio server. The audio server may then look up the equipment ID to retrieve the correct row in the Main Table 505A or schedule database 515B, then check the schedule in the sub table 540A or 540B, and then verify that the user ID is authorized to use the equipment at that time. In some embodiments, an additional column may be included that indicates whether a given piece of hardware is in use or not.

Figure 7:
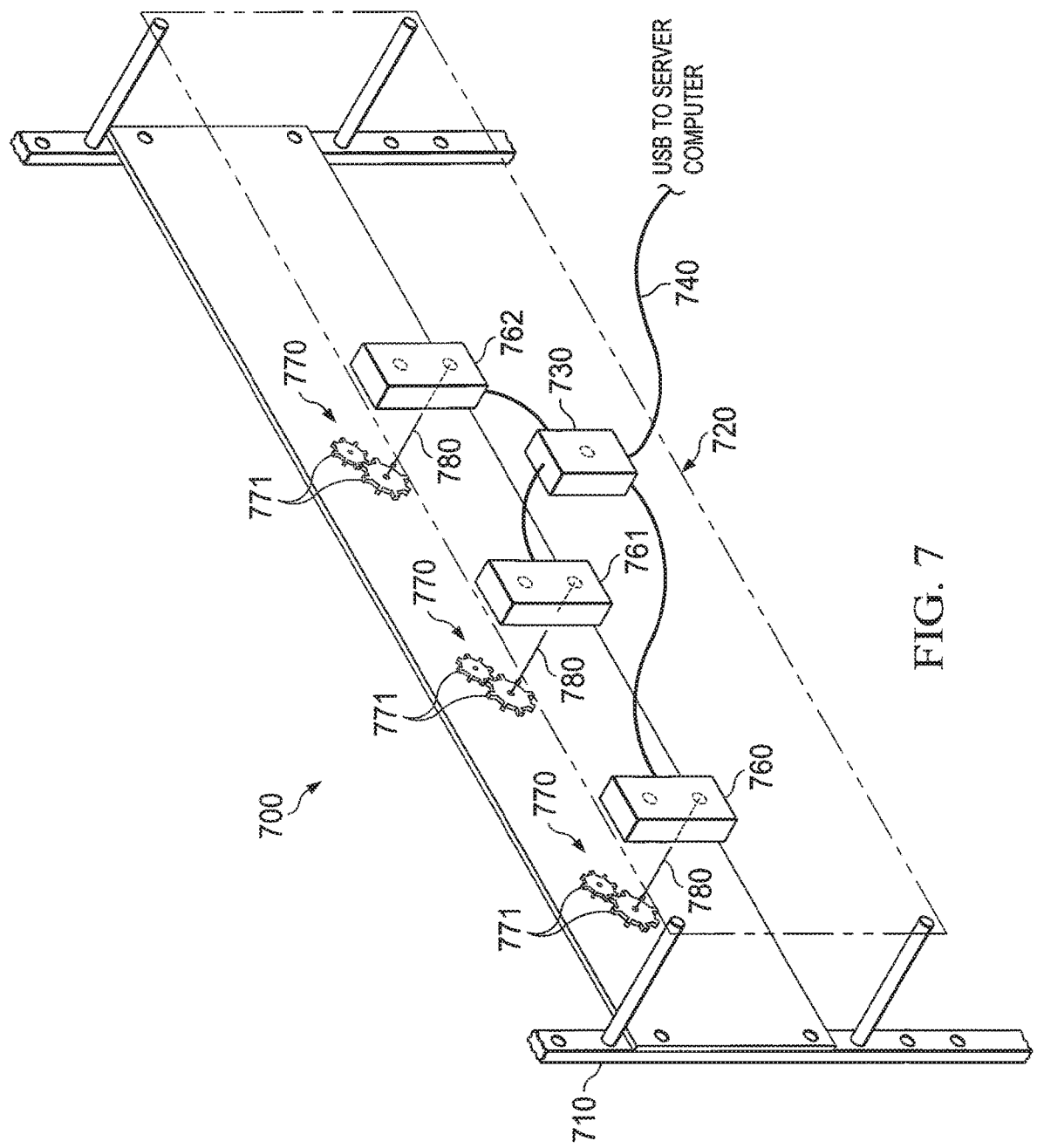
FIG. 7 depicts how robotic control hardware may be used to manipulate physical control knobs and buttons in an embodiment of the present disclosure.

FIG. 7 illustrates how a motor controller, one or more motors, and robotic gears can physically manipulate the knobs of the audio processors. FIG. 7 shows a front face of an audio processor 700 mounted on a rack mount 710. A mounting plate 720 is depicted as transparent in to order to show the mechanisms mounted upon it. A motor controller 730 is mounted on the mounting plate 720, and receives control signals from a peripheral bus 740. The motor controller 730 may control multiple motors (e.g., servo motors) 760, 761, and 762. Each of the motors 760-762 may rotate a gear 770 that interacts with a gear 771 that surrounds an audio control knob stem 780. Though not depicted, similar mechanical devices, such as levers, may manipulate other types of audio processor controls, such as buttons and switches. It is contemplated that other physical configurations of the mounting plate and motors may be used in accordance with aspects of the disclosure. For example, though FIG. 7 shows a space between the mounting plate and the face of the audio processor, in other embodiments, the mounting plate may be flush with the face of the audio processor, and may have holes cut out where the knobs and other controls are. In this embodiment, the motors and gears may be mounted outside the mounting plate. As another example, multiple smaller mounting plates may be used instead of one contiguous one.

FIG. 8 depicts the motor controllers of FIG. 7 in a logical block diagram that includes the audio server 800 and individual motors 820a-820i. As discussed briefly earlier, each motor controller may be used to control multiple motors. In various embodiments, as many motors and motor controllers as necessary to control the particular audio equipment may be used. As shown, the audio server 800 may be connected to the first motor controller by a peripheral bus connection 810. Subsequent motor controllers in the daisy chain, such as motor controllers 802 and 803 may be connected by serial wire interfaces 830. Each of the motors 820a-820i may be connected by a motor signal/power wire interface 840.

Figure 9A:
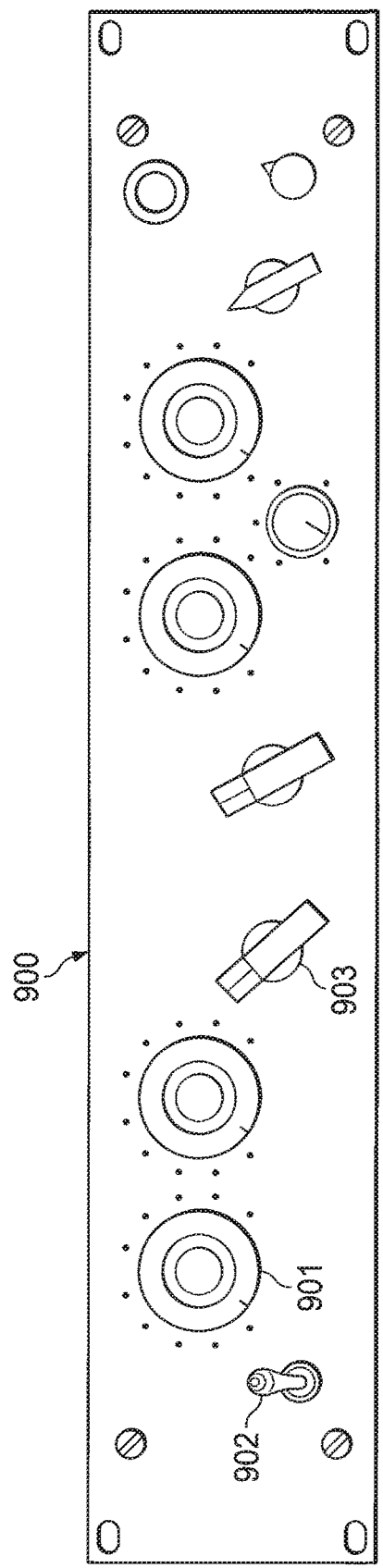
FIG. 9A shows an exemplary hardware audio processor that may be used in conjunction with embodiments of the present disclosure.
Figure 9B:
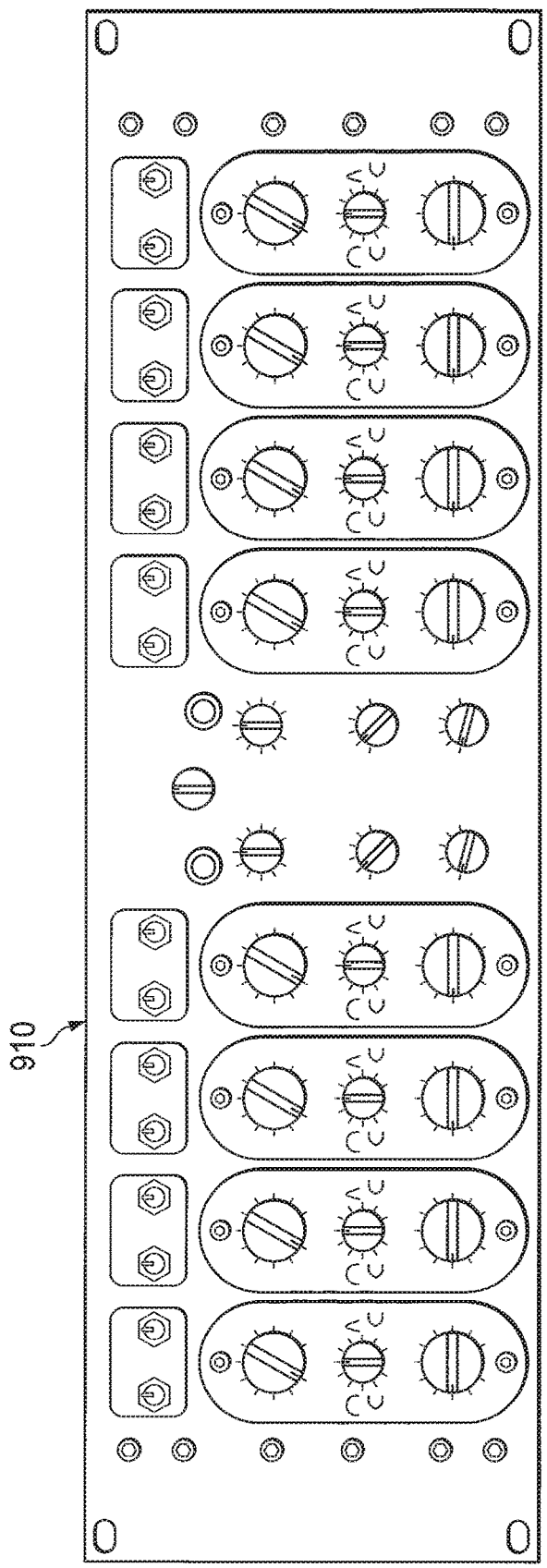
FIG. 9B shows another exemplary hardware audio processor that may be used in conjunction with embodiments of the present disclosure.
Figure 9C:
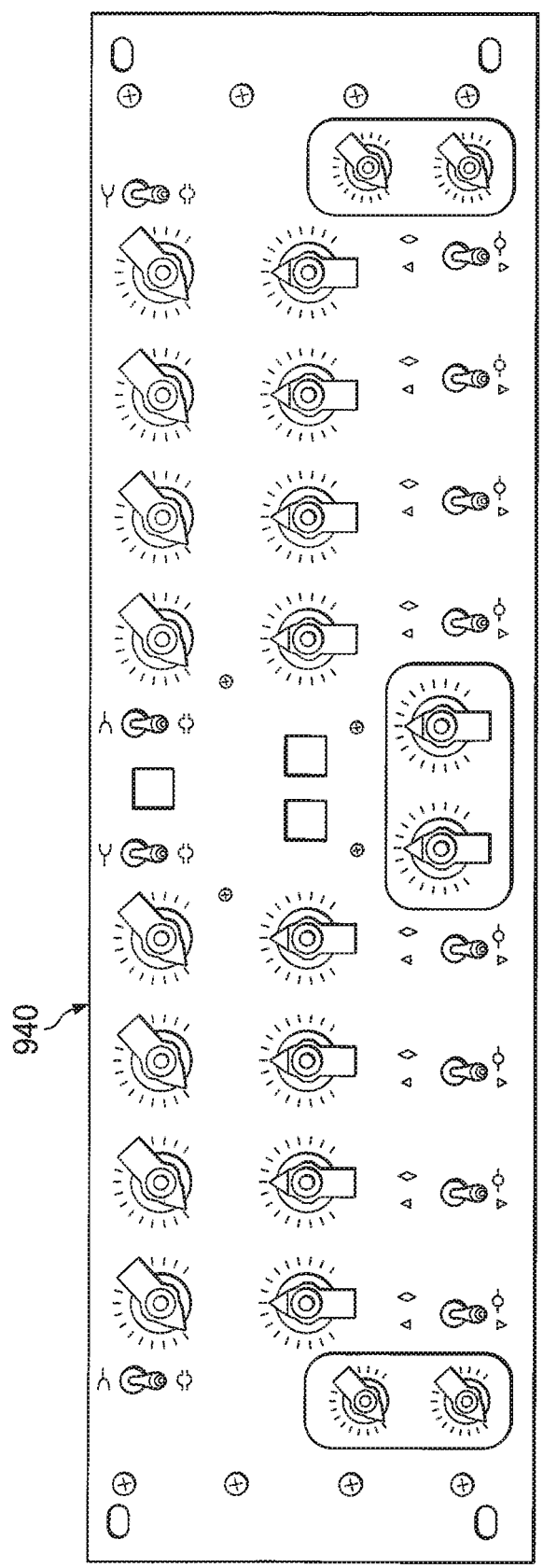
FIG. 9C shows yet another exemplary hardware audio processor that may be used in conjunction with embodiments of the present disclosure.

Turning now to audio processors, FIGS. 9A, 9B, 9C depict exemplary audio processing devices that may be used with aspects of the present disclosure. The hardware devices depicted represent existing single and dual channel vintage model equalizers having retail prices ranging from $3,000 to $6,000. It is contemplated that embodiments of the present disclosure may be configured to adapt to any type of audio processing hardware, including those existing and those yet to be created. To construct the motorized robotic controls of the present disclosure, a motor mounting plate may be attached to the same rackmount that the audio unit(s) are attached, as illustrated in FIG. 7. As shown in FIGS. 9A, 9B, and 9C, the number, position, and function of each of the controls of the audio processors can vary greatly between each piece of equipment. For example, the audio processor shown in FIG. 9A has a total of 10 control knobs, varying in size, whereas the audio processor shown in FIG. 9B has over 20. The mounting plates constructed for each kind of processor may be set to a height or distance away from the rackmount to allow it to fully cover the face of the audio processor. The required number of motors may then be mounted to this platform. Gears may be attached to the motors. Mating gears may be attached to the posts of the physical knobs. The motors may then be attached to the mounting platform and are rotationally spring loaded to apply just enough pressure into the gear-on-gear joint. The motors may then be electrically attached to the motor control unit. In other embodiments, the motors may use couplers in lieu of gears to directly attach the motor shaft to the equipment control system. In other embodiments, the motors may be attached to the mounting plate by a set of strong magnets, one of which is attached to the motor and the other of which is attached to the mounting plate. In such embodiments, the magnets may be offset laterally along the mounting plate. Each such motor and control interaction of the present disclosure may be arranged for the specific configurations of each piece of equipment.

As described previously, one aspect of the present disclosure is that users may be able to remotely "rent" the physical audio processors described in this disclosure and use them via the systems described herein. It is contemplated that a physical location housing a server and robotics hardware may also house many different pieces of rack mount processors (in some embodiments, dozens, or even hundreds) and that multiple remote users can use each piece of equipment simultaneously. For example, if there are twelve different audio processors, twelve users in twelve different locations can each be using one of the processors at the same time. As another example, for the same twelve different audio processors, six users may each be using two of the processors at the same time. In such an instance, a single user may be using multitrack audio software, and each track of audio could be using a different hardware audio processor via individual corresponding plugins running on the user's single computer. In yet other embodiments, multiple remote users may be about to use a single piece of hardware audio equipment at the same time. Another benefit of the system of the present disclosure is that the remote use capability enables more users to be able to use the equipment than a similarly-equipped recording studio would allow. That is, only one band or musician at a time may typically use a well-equipped recording studio because of the analog audio output from the processors. Because all the analog audio output is converted to digital and sent back to its remote originating source, dozens of musicians may use the room full of audio processing equipment at the same time.

Physically, the hardware audio processing unit or units may be mounted to a standard 19 inch rackmount chassis. Audio processing units come in various heights from 1U (approximately 1.75 inches) to 4U (approximately 7.0 inches). Several examples of hardware audio processors that may be used in accordance with the disclosure are depicted in FIGS. 9-12, but any other hardware audio equipment may be used in accordance with the system of the present disclosure. The particular devices shown herein are exemplary only, and are not to be construed as limiting the disclosure to such embodiments. One specific type of hardware audio processor that may be used in certain embodiments, but which is not shown in the figures, is known as a "microphone preamplifier" or "mic preamp". This equipment boosts the microphone level to a line level that is more easily handled and manipulated by other audio processors and equipment. It is contemplated that the audio server could host such microphone preamplifiers if the digital audio received from the client were a representation of the raw microphone output. Such embodiments could utilize a specialized A/D converter at the client location that could accept a microphone level. Although such specialized A/D converters are not widespread today, it is possible that they may become more widely used in the future. Therefore, in some embodiments, the audio server would then be able to host these types of microphone amplifiers under the same client/server system described herein.

Figure 10:
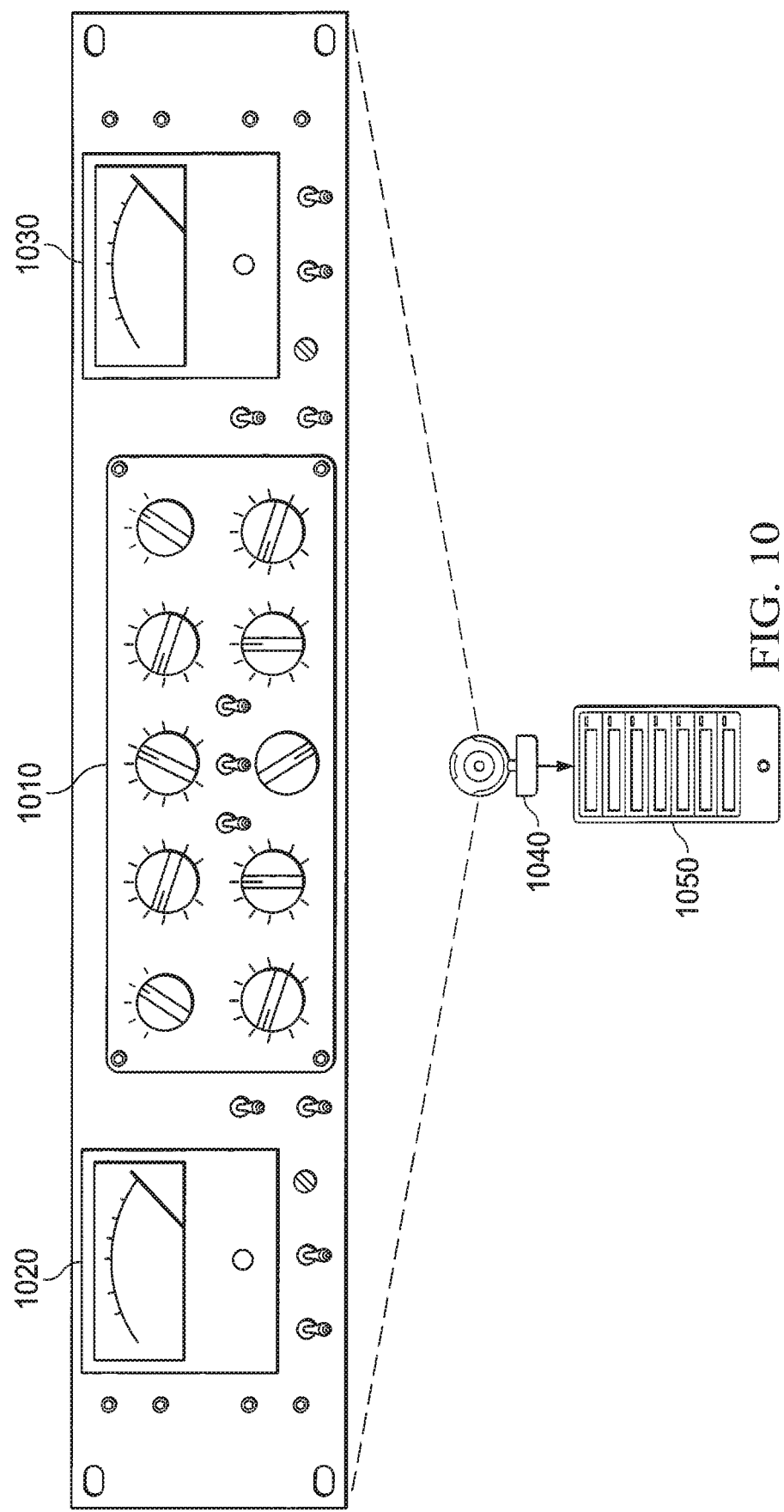
FIG. 10 depicts how an image capture device may be used to send visual feedback from a hardware audio processing devices to a user.

Another aspect of the disclosure relates to using visual meters within the system. Some hardware audio processors employ a variety of meters and indicators on the equipment front panel. For example, FIG. 10 shows an audio processing device having two volume unit (VU) meters. Other types of commonly used visual indicators include digital volume meters with multicolored bars and digital numerical displays. It is expected that this feedback is important to any user of the equipment, so the present disclosure provides a mechanism to convey this visual feedback to the client. A digital simulation of a meter display may be very straightforward to model and display to a user, but analog display feedback may be more difficult to accurately represent in software. That is, while this feedback can often be simulated by inspecting the audio at the client location through software, the specific hardware meters used in the equipment might contain characteristics that would make this simulation difficult. In particular, analog VU meters that employ a needle for the purposes of showing an overall loudness of a mix are especially difficult to model. While there are many types of highly precise digital metering tools, some of which can measure even the smallest changes in a particular audio signal, there are certain characteristics of an analog VU meter that make its response somewhat less precise, but more desirable for specific purposes. In particular, VU meters are electromechanical, and the mass of the metallic needle delays and dampens responses to small and short variations in individual signals within a mix. It does, however, respond very quickly to changes in the overall volume of the mix. As a result, it displays an accurate and desirable response for the overall loudness of the mix around a particular target for a user, but one that is non-linear and imprecise at low levels. It is more useful, in some applications, to use the analog VU meter, with its specific dampening characteristics imparted by the needle and the other electromechanical components, than it is to see precise digital feedback through other meters. While it is possible to model a VU meter through software to display one on a graphical user interface, it is difficult to do so. This difficulty arises in part because any software algorithm that would calculate the position of a digital needle on a screen would have to account for not only a measured audio signal (which would be relatively straightforward to translate into a linear visual indicator), but also for the variations in how a needle physically dampens a response at low levels. Because the dampening is non-linear and imprecise by nature, it is hard to program such variations in an algorithm.

In order to provide accurate and authentic-looking visual representations of VU meters and other visual indicators to an end user, an aspect of the present disclosure provides systems and methods for using a combination of software and recording hardware to model a VU meter. The method of the present disclosure comprises visually recording the face plates of hardware audio processors, digitally processing the recorded images, and then presenting a digital representation of the images to the user. FIG. 10 shows one embodiment in which an image capture device 1040 (e.g., a digital video camera) may be placed in a location where it can record each visual meter 1020 and 1030 of an audio processor 1010. The capture device 1040 may be set to obtain a new digital video image at a normal video rate of 24 or 30 frames per second. In some embodiments, the video image itself may be sent in substantially real time to the user. In such an embodiment, the GUI of a plugin could contain a view of the audio processor comprising both modeled software controls and actual video footage of its VU meters. Sending such video data may require large amounts of bandwidth, so in order to mitigate any latency issues that might arise from sending actual video, other embodiments of the disclosure may instead translate the video images into digital GUI representations. The present disclosure provides a method to create representations based on the video, rather than based on an audio signal itself, in order to accurately relay the visual analog measurement of the VU meter.

Figure 11:
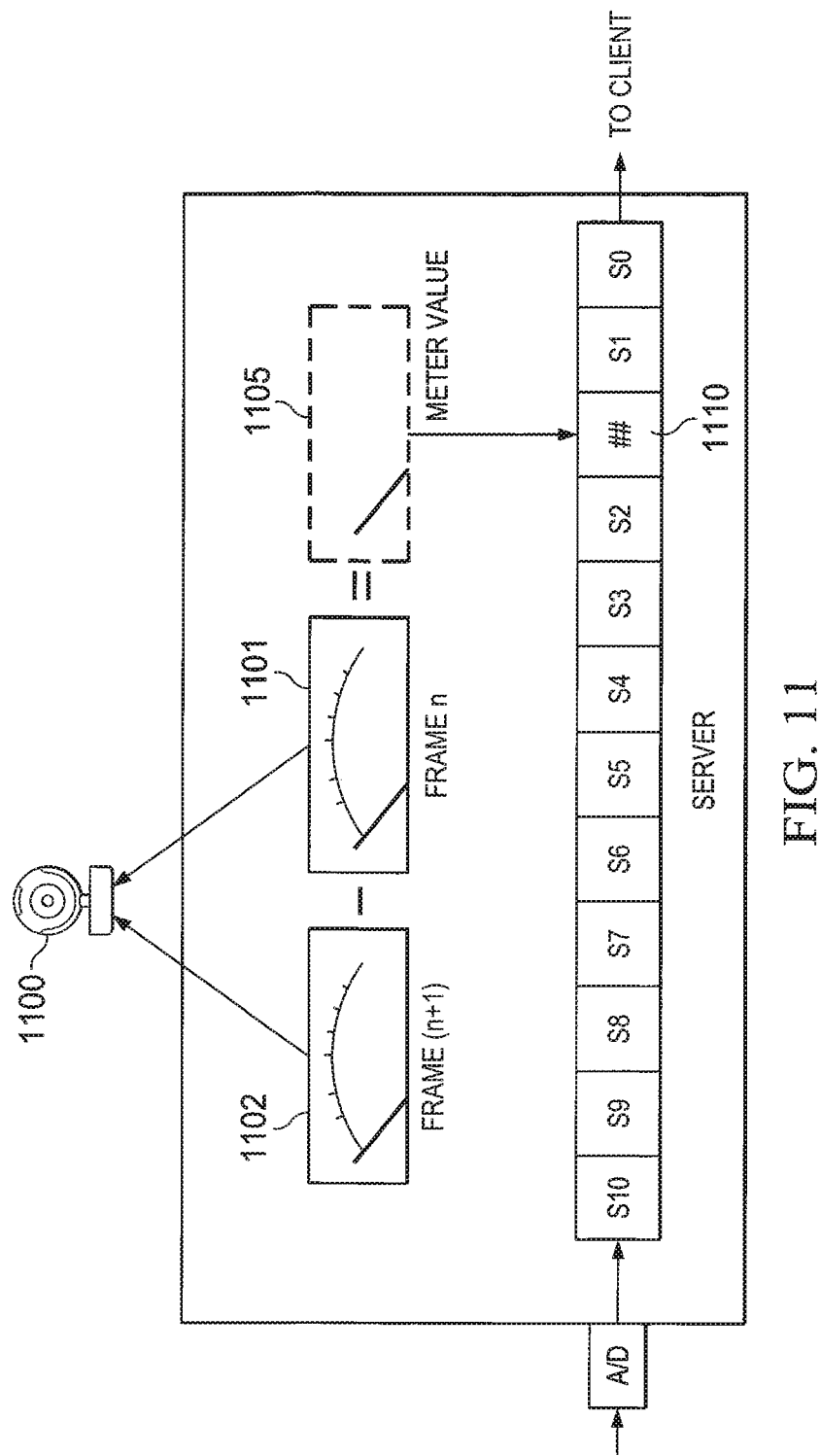
FIG. 11 depicts how visual feedback from a hardware audio processing device may be transmitted to a client.

To create the digital GUI representation, the captured video images may be sent to the audio server 1050. The audio server 1050 itself may comprise software for the plugin associated with the equipment being video recorded. The GUI shows a rendering of the equipment's VU meter. This rendering may comprise the background of the VU meter, which remains the same, with the needle being the only portion of the VU meter that changes positions (and therefore changes on the display). FIG. 11 shows how successive frames 1101 and 1102 of the video are sent to the audio server, the plugin software may detect the difference between the position of the needle in consecutive frames and calculate the delta in pixels of the frame. The difference is shown as the digital image 1105. The delta of the pixels can be used to calculate a new needle position, and this new needle position can be transmitted to the client in a single numeric value that would use substantially less bandwidth than transmitting the entire meter video image. The client would then use this numeric value to update the virtual needle in the plugin GUI. The amount of data sent to the client to communicate the movement of the needle may be significantly less than the amount of data needed to send an entire video, but may be just as accurate a representation of the needle. In one embodiment, the meter value information may be sent as part of the audio stream by being inserted in between audio samples S1-S10, as depicted by meter value 1110.

Turning now to FIG. 12, from the client user interface point of view, playback is started on the client computer and audio begins streaming into the plugin, when audio is routed through the server and back to the client computer as described above. The user can optionally choose to interact with the virtual control panel 1210 in order to send control signals to the audio processing hardware. If a knob is changed (e.g., via keystrokes, a mouse, a touchpad, or other input mechanism), a control message is sent to the server as described previously. Some buffering of audio data may be required in order to keep the audio stream continuous from the client's point of view even when there are small momentary interruptions in the WAN. Various implementations of audio data buffering will be described throughout the disclosure. This buffering may cause some delay (e.g., on the order of 100 milliseconds), but such a delay will be small enough to allow the audio data processing and control to be perceived by the user as "real time." A key benefit of providing processed digital audio back from real analog audio processors in substantially real time is that users may use the remote hardware in substantially the same way—controlling each knob, button, and switch—that they would if they were physically in the same room with the hardware.

An additional benefit of the system is that the software components can store particular settings of knobs for future reference and use. Currently, when musicians use an actual audio hardware box, they can send their audio through it at their own client locations using their own A/D converters. The audio from the musician's instrument or computer program will stream out through cables, into the audio equipment, and back through connected speakers in real time. If a user wants to change the knobs on the audio, the user can manually adjust each one. One of the disadvantage to using hardware audio processors this way is that, though a user can manually adjust each knob exactly as desired for one recording session, the user must remember whether those same settings are correct the next time the audio equipment is in use. That is, when a user finishes a particular recording session, the user typically shuts down the audio software and may or may not leave the knobs in place. Later, when the user returns to the equipment for the next session, the user must determine whether the knobs are in the exact same position as the previous time. In some cases, a user may want to have the controls in a particular configuration for a first song, and then have them set in a different configuration for another song. If the user wants to duplicate the exact sound from the first song, the user must write down or remember the particular configuration, which is a difficult and inconvenient task given the number of controls on most audio processors. An advantage of the system of the present disclosure is that it may remember a user's settings for any particular song, save them, and return the knobs in the exact configuration as saved. This is because the software knobs in the plugin store their state on the client hard drive with the third-party application. When the application starts again and recalls data from disk, it lets the plugin know what the previous values were, so the plugin simply has to send them to the audio server for initial positions, and the robotic hardware will set the physical controls accordingly.

Figure 12A:
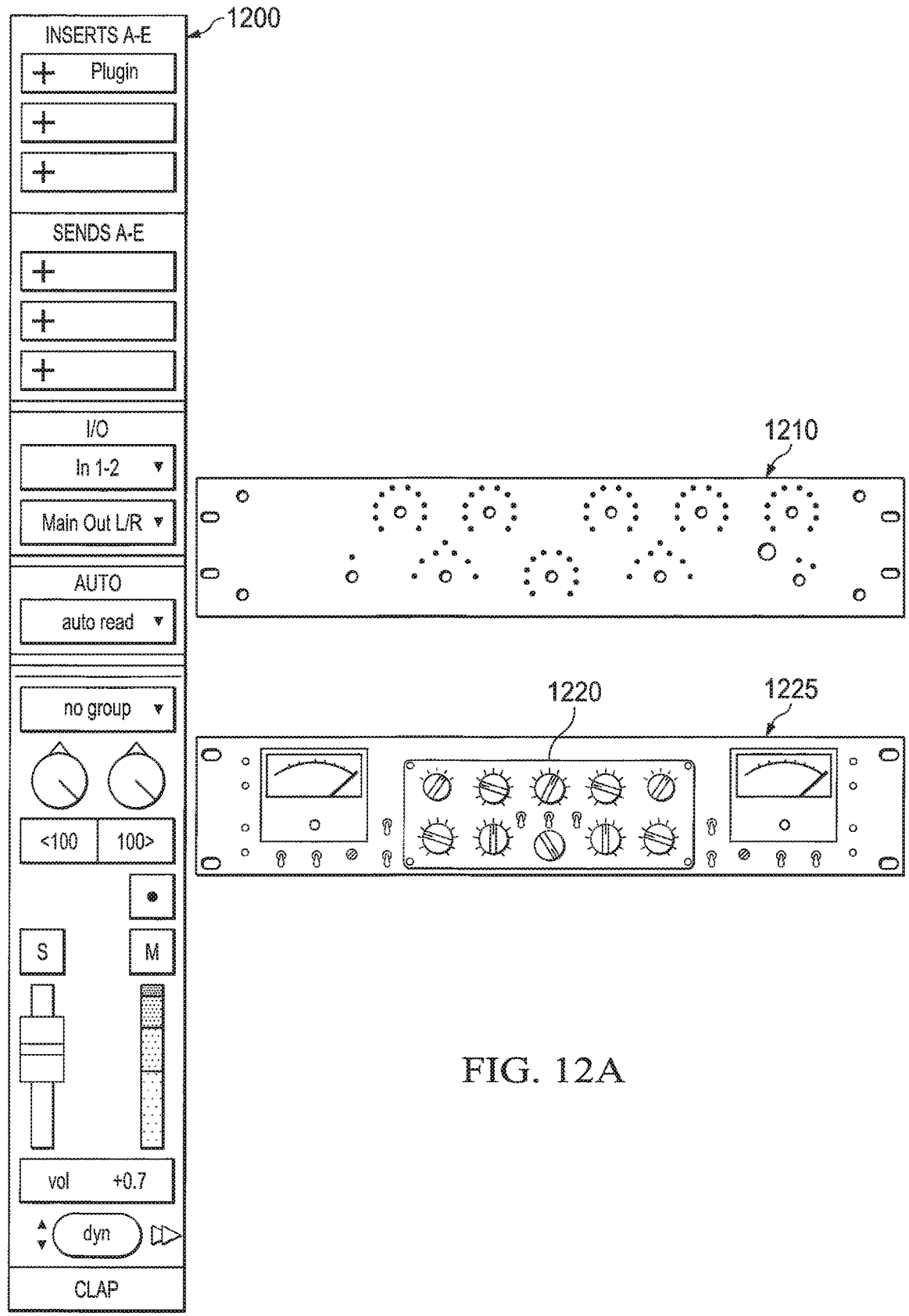
FIG. 12A shows exemplary graphical user interfaces for a client plugin, virtual hardware controls, and visual meter feedback.
Figure 12B:
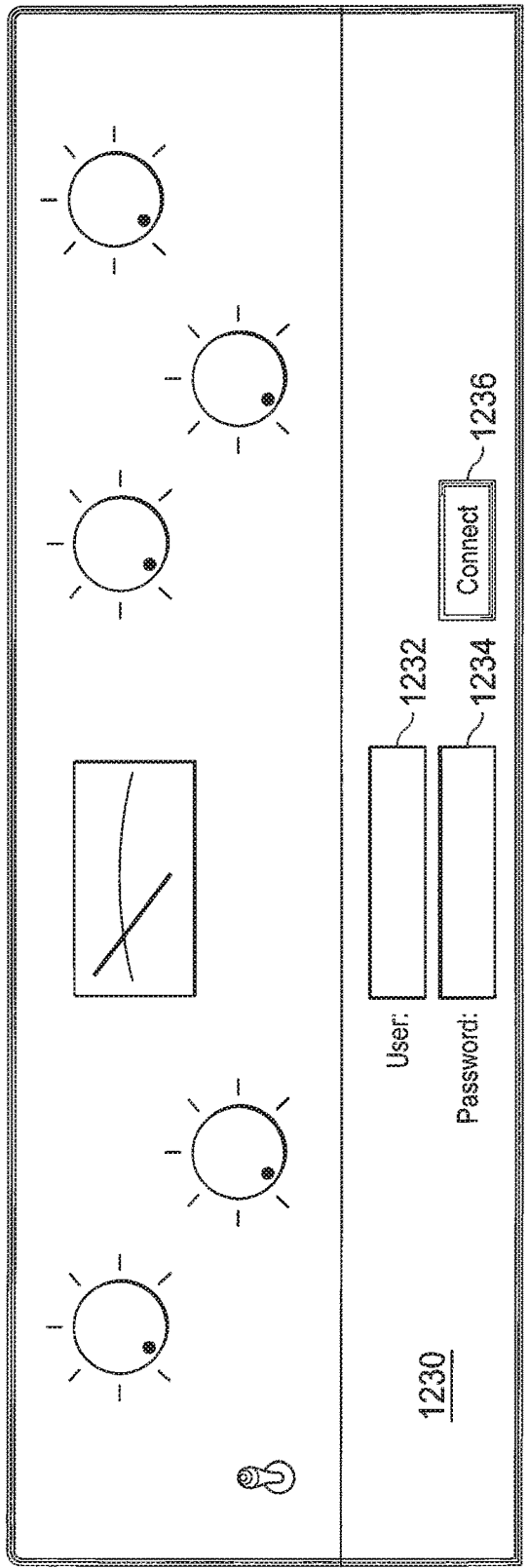
FIG. 12B shows an exemplary graphical user interface for login and authentication functionality.
Figure 12C:
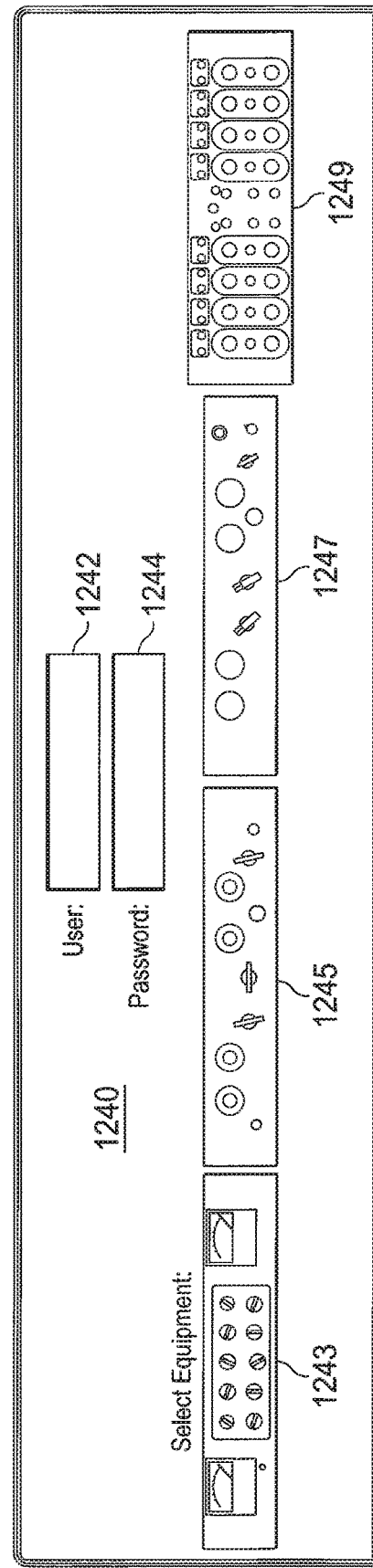
FIG. 12C shows an exemplary graphical user interface for equipment selection functionality.

FIG. 12 also shows that the client plugin 1200 uses a virtual processor GUI 1220 that copies the front panel of the actual hardware device that a user desires. The virtual processor GUI 1220 includes a virtual VU meter 1225, which may be implemented by the systems and methods described in FIGS. 10 and 11. FIG. 12B depicts an exemplary plugin GUI with login section 1230, which may allow a user to input a user name in a user name field 1232 and a password in a password field 1234, and then initiate a connection through a connect button 1236. In some embodiments, the web interface may present a user with options of which available hardware processors the user wishes to rent. FIG. 12C shows an equipment selection interface 1240 that may be implemented by the web server shown in FIGS. 4A and 4B (or by a combination of the web server and audio server). The user may provide a previously registered user name in a user name field 1242, a password in the password field 1244, and may select equipment using icon buttons 1243, 1245, 1247, and 1249 that visually represent available hardware audio processors. The equipment selection feature allows the user to not only pick the equipment type that they want, but also the unique audio hardware box that they want, in cases where there is more than one piece of hardware of a given model. This option is provided because some users may hear subtle differences between audio processors of the same model, due to their analog nature, and may end up with "favorites" and specifically want to reserve them. The unique equipment IDs provided in the databases shown in FIGS. 5A and 5B may be used to implement the selection of specific hardware boxes as described.

Figure 12D:
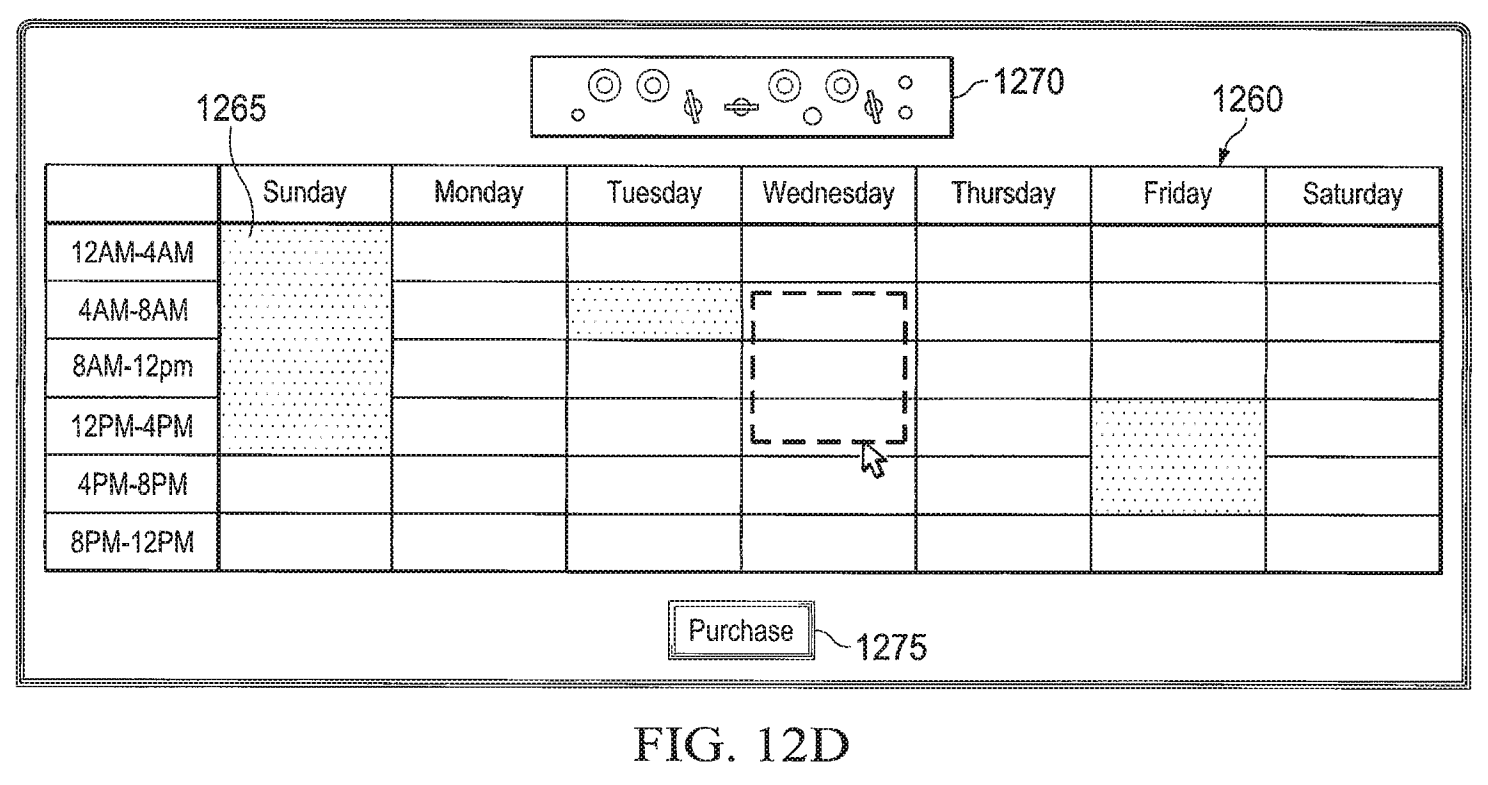

Alternatively, the host recording software application could contain and present a set of plugins, each one representing available remote hardware, and the user could select one or more of the plugins. The plugin software may run when the plugin is selected by the user in the host audio program (e.g., the recording software application). When the plugin corresponding to the equipment types is selected, the authentication method step 6 shown in FIGS. 4A and 4B sends the user ID and password to the database. The plugin also inherently sends the "equipment type" information because the plugin corresponds to an equipment type. The database then finds the first piece of equipment matching the equipment type and provides the specific equipment ID for the session, unless the user has already specified the equipment ID themselves. In many embodiments, separate plugins for each audio hardware model may be provided to a user. It is also possible, though, that one master plugin may be provided and may allow audio hardware selection within it. FIG. 12D shows an exemplary scheduling interface 1270, which shows a schedule table 1260, reserved blocks of time 1265, and a purchase button 1275. The scheduling interface 1270 may be implemented by the web server and audio server as shown in FIG. 5. Each of the user interfaces shown in FIGS. 12A-12D are exemplary only, and many embodiments of interfaces may be used to implement the functionality described throughout this disclosure.

Figure 13:
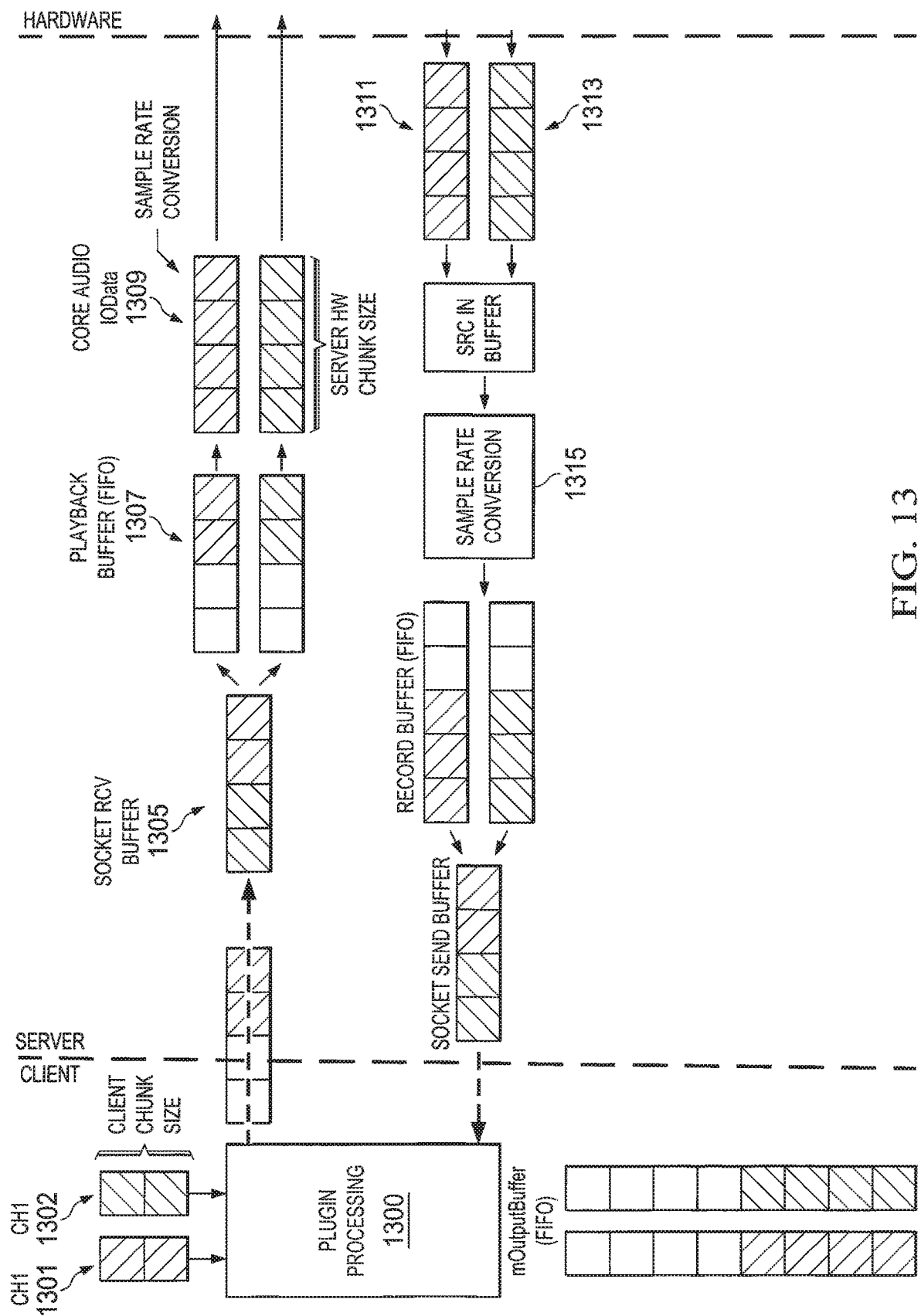
FIG. 13 shows how audio buffers may be transported from a client through a server to a hardware audio processor and back according to an embodiment of the disclosure.

FIG. 13 shows one embodiment of how buffers of audio data, which are groupings of samples that are processed together at any point in the audio pipeline, may be transported across one or more sockets of an audio server for efficient transportation to and from an audio processor according to the disclosure. The client host software application may allow a user to select how large or small the buffers are. Buffers can range in size from between 64 to 2048 samples. Smaller buffers generally result in less latency but require more processing power. The buffer transport depicted herein may also help account for differing sample sizes between those sent and received by a client and sent and received by a hardware audio processor. It may also help handle challenges associated with asymmetric audio processing, which will be described later in the disclosure. Typically, sample rate converters are used any time an input audio signal uses a different sample rate than the format or device through which it is being converted. In the present disclosure, because there is an audio server between the client device and the hardware audio processing device, and because buffers travel over a network to be processed, additional consideration must be made for how the server receives, relays, and sends back audio signals between the client and hardware audio processing devices. The buffer transport system of the present disclosure also solves the problem of temporary dropouts in a WAN connection. Internet connections are imperfect, which result in data not always being delivered consistently and in short drops in connection. In some embodiments, sockets may be designed to reduce the number of buffers in the receiving and returning pipelines, which may reduce the latency associated with transporting buffers across a network. In other embodiments, sockets may be designed to reduce the complexity of any socket setup or teardown required.

The embodiment in FIG. 13 shows a client program/plugin 1300 with two input audio channels 1301 and 1302. Each input audio channel is shown inputting two buffers at a time, which may represent a typical number of audio channels going into a plugin. The buffer size for each channel is set according to the client host audio program. The buffers from each channel are shown as being sent in an interleaved manner to a single receiving socket 1305. The receiving socket 1305 then splits the buffers from each channel back into two for the playback buffer 1307, which queues the buffers to be sent to a sample rate converter 1309 on a first in, first out (FIFO) basis. The sample rate converter 1309 is shown as converting the two buffers received from the client through the socket into three buffers. In such an example, the hardware audio processor may have a sample rate that is equivalent to three samples for the audio processor for every two samples received from the client. That is, the hardware audio processor may send and receive audio buffers in chunks of three buffers at once. As shown, the hardware outputs two audio channels 1311 and 1313 with three buffers each. These three buffers are then sent back through a sample rate converter 1315. The transport of audio and control data from the client to the server can be done a variety of ways. FIG. 13 shows that audio can be interleaved over a socket while control data could be sent over a separate socket. In other embodiments, the audio data could be sent on a separate socket per channel of audio to remove the interleaving cost. In yet another embodiment, the control data as well as all audio data could be interleaved on a single socket.

In order to accommodate continuous playback of samples using the system in FIG. 13, the samples may be accumulated into a first buffer queue at the server (for client-to-server audio streams) and into a second buffer queue at the client (for server-to-client audio streams). The accumulated samples in each buffer queue can then provide continuous playback at the server and/or client location when WAN dropouts might occur momentarily due to the unpredictable nature of a WAN connection across the internet. Although temporary dropouts may occur, the steady state flow rate for the audio streams must be supported by the WAN connection bandwidth. Loss of audio samples may be prevented at two key locations (the server and the client) by utilizing the buffer queues described herein. By having the first buffer queue built up to an appropriate number of samples, there will typically be a sufficient number of samples being sent to hardware in the operating system audio driver that are ready to be converted in the A/D interface. Similarly, the samples at the client output (i.e., second) buffer queue will typically be sufficient to pass on to the host audio program or hardware interface at the client location even in the case of temporary WAN connection interruptions.

To ensure these locations always have available samples, the buffer queue methodology of the present disclosure may allow the initial playback of the stream to grow the server playback buffer queue (first buffer queue) and client output buffer queue (second buffer queue) to comprise a larger number of samples than that ordinarily required by the stream flow rate. The server playback buffer may be increased at the start of the audio stream by allowing samples to flow into the playback buffer but not sending them on to the OS (operating system) audio driver right away. While this may create delay and latency in the audio stream, it may be beneficial to ensure subsequent uninterrupted audio flow. Once the playback buffer is sufficiently large, audio samples may begin flowing to the OS audio driver and A/D interface. Similarly, when the client begins receiving processed samples from the server at the start of the audio stream, it may queue those samples in the client output (second) buffer queue. The result is a buffer queue, or set of samples, split into a first and second buffer queue, across both client and server to protect against WAN interruptions or situations where the outflow of the buffer might temporarily be larger than the inflow. The second buffer queue at the client output may also be used to implement another aspect of the disclosure known as "early playback," which will be described later in this document. The system can be designed such that the client and server buffer queues are approximately the same size, and the summation of those buffers represents the total latency of the system. For example, if the total number of samples in the entire buffer queue is 100 samples, the first and second buffer queues can be split into approximately 50 samples each at a given time during playback. The "early playback buffer" described in the synchronized watermark section later in this disclosure can be designed to be just as large, or slightly larger than, this latency size so that playback remains uninterrupted through the entire operation.

It is envisioned that in some embodiments, the size of the symmetric client/server buffers can be tuned by the client. A GUI control could be implemented that would set the size of the client output (second) buffer at the client, as well as the number of samples for the server playback queue shown in FIG. 13 to accumulate before starting to send samples to the audio driver. This GUI control would allow clients with differing WAN connection quality the ability to tune the system to accommodate their particular situation.

Some embodiments could include some form of general or audio-specific compression in order to reduce the WAN bandwidth requirements. When samples are exchanged with the socket at the client and server, the compression and de-compression algorithms could take place. This would allow the specific WAN segment of the pipeline in FIG. 13 to be using compressed data, where the rest of the pipeline could be using uncompressed data.

Another feature that could be implemented in some embodiments is a secure communication channel across the WAN segment. For example, if the socket connection is based on TCP, the Secure Socket Layer (SSL) protocol known in prior art could be used to encrypt the data on the WAN segment of the pipeline shown in FIG. 13, in order to prevent unauthorized access to the data when transmitted over the public WAN or internet.

Figure 14:
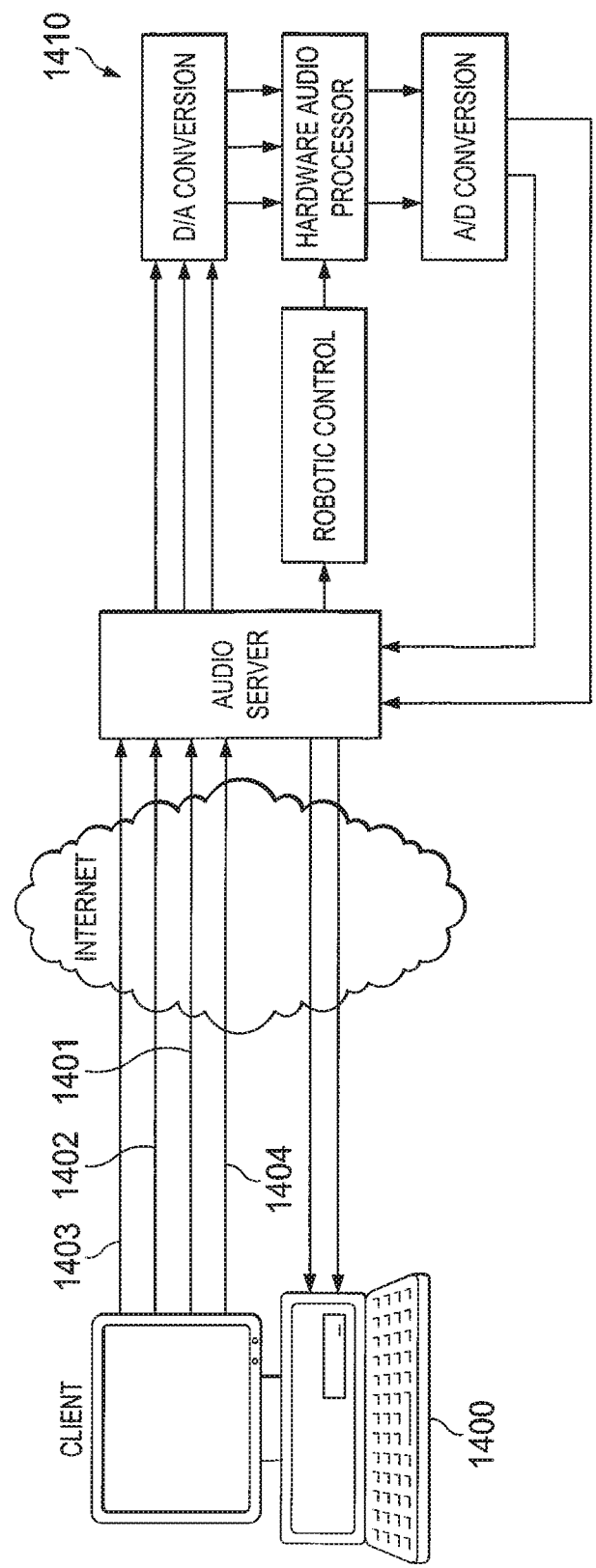
FIG. 14 is a high-level diagram showing how asymmetric audio inputs and outputs may be sent and received according to embodiments of the present disclosure.

While many hardware processors utilize an equal number of inputs and outputs, there are some cases where the number of input and output ports may differ. FIG. 14 shows the flow of audio signals in such cases where the number of audio signals sent into an audio processor are different from number of audio signals sent out from it, which is known in the present disclosure as "asymmetric audio processing." There can be cases where the audio processor may take one or more audio channels to be processed, but the processing that will take place depends on one or more independent audio signals. A typical implementation is commonly known as side-chain compression (or alternatively, as a "key signal"). In side chain compression, two (or more) independent audio signals are sent into a processor. For example, a user may input a first audio signal from a bass drum, and a second audio signal (known as a side-chain) from a bass guitar into the same processor. The user may desire that the bass drum signal be compressed (i.e., somewhat muted) at the exact point in time that sound from the bass guitar comes through the processor. This may be done for the purpose of allowing a user to hear the bass drum more clearly. Side chain compression can also be used to adjust the level of audio signal that comes through for vocals over background music, for example.

A particular audio processor may ordinarily have the same number inputs and outputs; for example, a processor may receive two input signals, which may be from one instrument but split into two signals. The processor may then send two output signals, such as one for a left channel and one for a right channel. A plugin corresponding to this particular processor may take two inputs from the host audio program. If the hardware has an optional side chain input, the plugin may also provide an input for this optional side chain input from the host audio program, assuming the host audio program has a provision for such an input in the given plugin format. In FIG. 14, the client 1400 is shown sending a side chain signal 1401 and two input signals 1402 and 1403. The plugin may also take an additional input from the host audio program as a side chain input. The trigger for the compression (i.e., the source of the signal that causes) is based on the audio side-chain 1401, but the compression or volume reduction is applied to the other audio input signals 1402 and 1403. The fourth signal 1404 is the robotic control signal. The hardware audio processor 1410 still produces two processed output signals, even though it receives three input signals. The number of signals a given hardware processor may receive and produce is determined by the hardware processor itself. In the example shown in FIG. 14, the client may be sending a different number of audio channels to the server than the server is sending to the client, hence the term "asymmetric audio."

Though not shown, another example of asymmetric audio may comprise one audio signal from client to server going into the audio processor which could then produce multiple outputs that would be sent back from sever to client. For example, an audio processor that produces a reverb effect can take a single input and produce distinct reverberation applied separately to an output left and right channel, making the audio signals asymmetric in that one signal goes in while two or more go out. These special cases for audio processing are not necessarily problematic for the systems and methods presented in the disclosure. However, it should be understood that certain features of the system described herein may be implemented in ways that accommodate such asymmetric audio. For example, the systems and methods for buffering and synchronization through watermarking may be applied to asymmetric audio processing as well as symmetric audio processing.

One aspect of the disclosure provides a method to allow immediate playback of an audio signal during a delay period that may occur during the sending and receiving of the processed audio. Users of audio processing equipment are accustomed to hearing audio playback immediately when the user presses play within their audio application at the client location. It may take measurable time to send audio to the server and back—sometimes 50 ms or more depending on client-server connection quality over the WAN or internet—and such a user-perceptible playback delay may be undesirable. In order to account for such a delay, aspects of the present disclosure provide a feature to immediately provide audio playback for a brief time at the beginning of client playback. This feature may be referred to as "early playback" in the present disclosure. Once the early playback period is expired, processed audio samples from the hardware audio processor will be ready at the client computer for continued audio playback in the client host audio program. FIGS. 15A-15F illustrate the method for early audio playback according to the present disclosure.

Figure 15A:
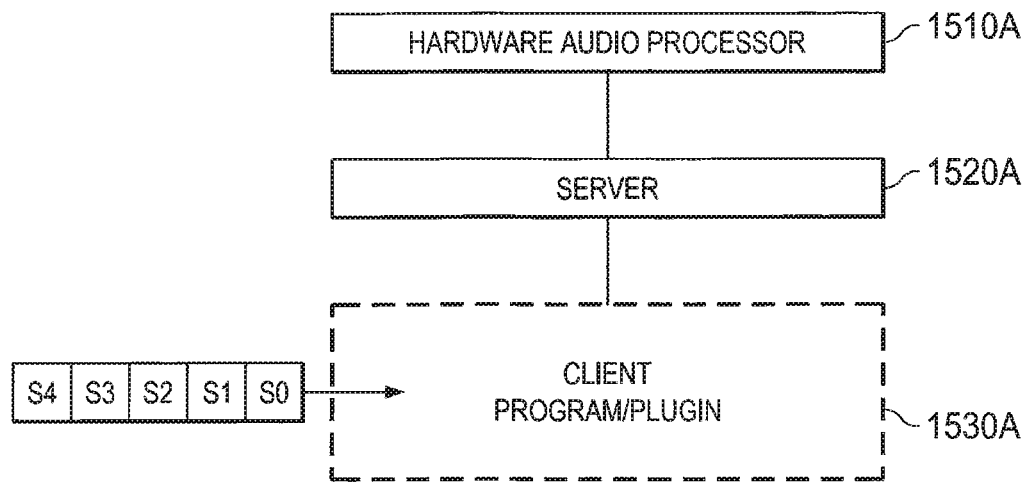
FIGS. 15A-15F show steps of a method for providing early unprocessed audio playback and a smooth transition to processed audio playback.
Figure 15B:
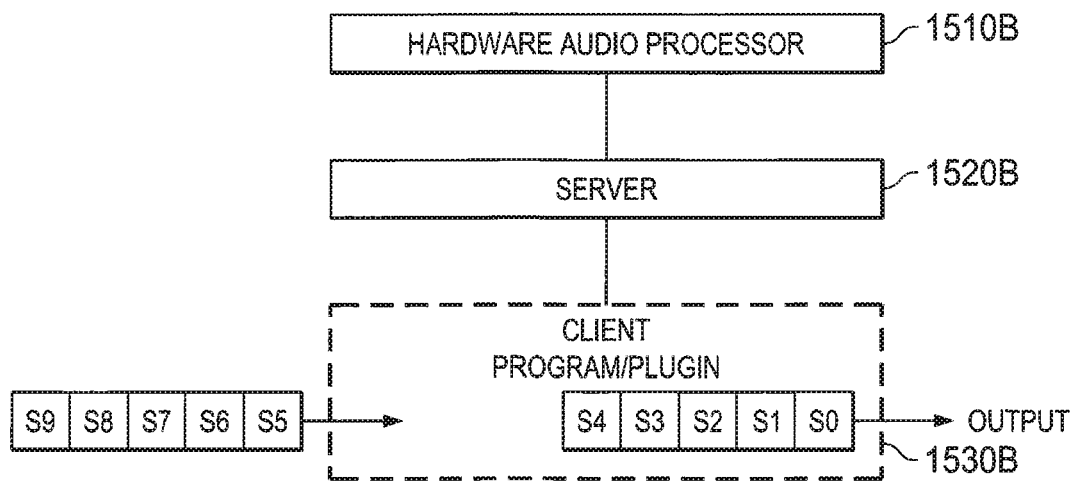

Turning first to FIG. 15A, some number of initial audio samples from a client recording or instrument input must be provided immediately in order to generate early playback of the recording or instrument audio for a short duration of time. This mechanism to provide an initial set of audio samples up front is common in host audio recording programs. The plugin is coded in software to inform the host audio program that it has a latency of N samples. The host audio program will then provide N samples to the plugin up front just before playback begins, referred to as early playback samples in this document. In FIGS. 15A and 15B, the host audio program provides five samples in this manner, and the plugin can choose to use those samples in any fashion. In the present system, those samples are used to create the early playback queue, which can be the same client output buffer queue described earlier in this disclosure, so that these unprocessed samples can be provided at the plugin output while the processed pipeline to the server is being filled.

Similar to other parts of this disclosure, any audio signal may be referred to as an "unprocessed" or "unprocessed version of" an audio signal when it is being generated or transmitted before it reaches a hardware audio processor, and may be referred to as a "processed" or "processed version of" an audio signal when it is being transmitted or played after it leaves the hardware audio processor. FIG. 15A shows a first set of audio samples, which are labeled S0 (a first audio sample) through S4 (a fifth audio sample). Samples numbered in this manner throughout FIGS. 15A-15F may be construed to be samples taken from an audio input (e.g., a recording) in the order that they are numbered. The number of samples should be a sufficient number of samples to cover the time that it takes to get the client/server audio streaming pipeline filled and to the point where it is providing processed audio from the hardware audio processor 1510A back to the client host audio program 1530A. In FIGS. 15A-15F, this number of samples is shown as five, (S0-S4), but more or fewer samples may be required for various implementations. In most embodiments, this early playback methodology may require that a predetermined number of audio samples are readily and predictably available. Therefore, the early playback methodology may be implemented when using pre-recorded audio.

FIG. 15B shows how the early playback methodology of the present disclosure uses the early playback samples to provide audio at the output directly back to the client host audio program during the early playback period. That is, playback will start with unprocessed audio, with the initial samples S0-S4 of FIG. 15A being played through the client host audio program 1530B without being sent to the audio server 1520B or hardware audio processor 1510B. Thus, the initial samples S0-S4 are shown going directly to the output of the client host audio program 1530B. This playback may take place until subsequent processed audio samples start to arrive from the hardware audio processor 1510B and server 1520B.

Figure 15C:
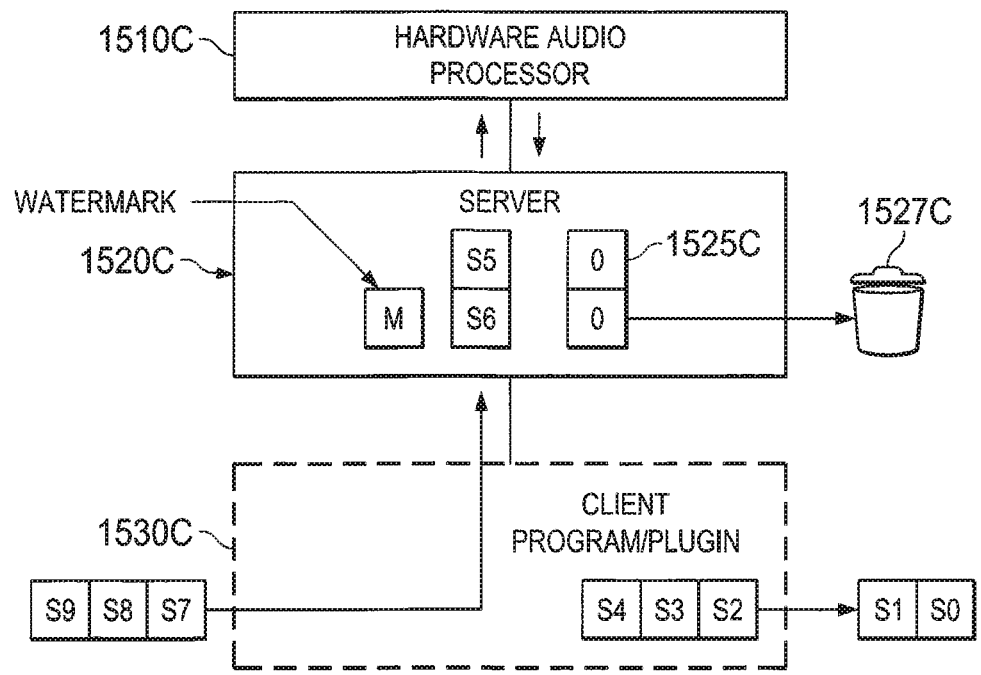

FIG. 15C shows that subsequent samples S5-S9 after the first samples S0-S4 are sent through to the server and back to the client as described throughout other parts of this disclosure. Samples S5 and S6 are shown as being received in the audio server 1520C. An aspect of the present disclosure is that the audio server 1520C may add a marker into the stream of audio samples in order to facilitate a seamless transition of audio output from unprocessed to processed audio. Throughout the disclosure, the marker may be referred to as a "watermark." As implemented the watermark may be an analog or digital signal alteration, such as a square audio wave inserted in between the start of the first audio samples going into the processor, or an instruction written in code to be executed by the audio server 1520C, for example. In FIG. 15C, the watermark is illustrated as a block "M" within the server, to signify that it will be added to the stream of audio samples in front of S5. The watermark signal itself may or may not be affected in any way by the hardware audio processor 1510C when it arrives there, but is placed in the audio stream for the purpose of allowing the audio server 1520C to recognize the watermark once it arrives back at the audio server 1520C in front of the processed samples, as will be illustrated in the next figures. In FIG. 15C, two blocks labeled "0" are shown in a return pipeline 1525C of the audio server 1520C to illustrate that there is no processed audio signal coming through the audio server 1520C. These sample blocks labeled "0" represent the incoming A/D samples that may arrive before the desired processed audio. Until the marker is detected, all incoming A/D samples are thrown away and not forwarded to the client. Consequently, there is also no processed audio signal being sent to, or played back through, the client program 1530C. While the audio server 1520C and client program 1530C are waiting for processed audio to arrive, the unprocessed audio samples S0-S4 continue to play back through the client program 1530C. The "0" blocks in the return pipeline 1525C are shown as being discarded by a discarding component 1527C to illustrate that a silent signal (e.g., a flat audio wave) would not be sent to the client program 1530C, because that would result in an undesirable sound, such as white noise or a popping or crackling sound to the user.

Figure 15D:
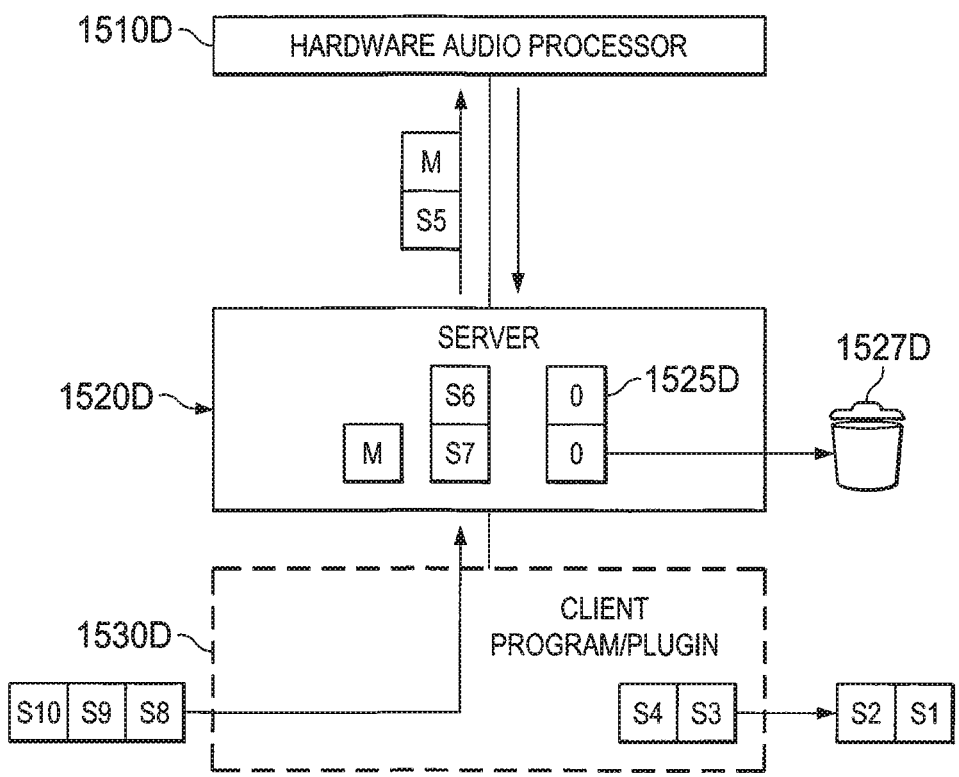

FIG. 15D shows how the watermark M, once added by the audio server 1520D in front of the unprocessed sample S5, is sent to the hardware audio processor 1510D. Additional unprocessed audio samples continue to be sent from the client program 1530D through the audio server 1520D, while silent signals 0 continue to get discarded by the discarding component 1527D, and the unprocessed first samples S1-S4 continue to be played back early to the client.

Figure 15E:
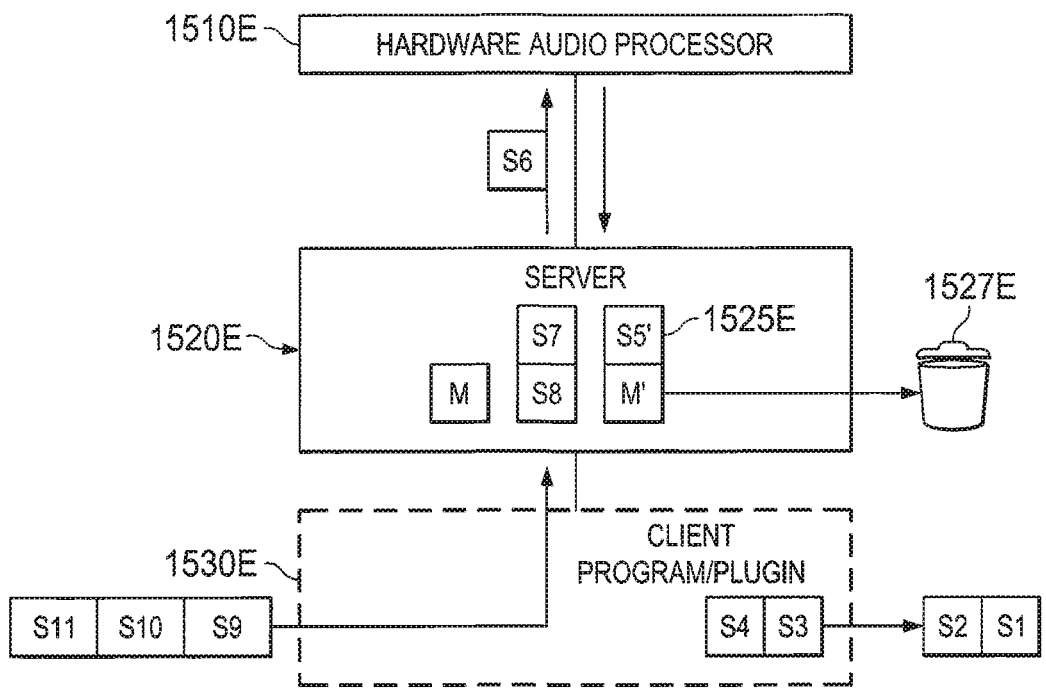

FIG. 15E shows the watermark and the first processed sample as they are returned to the audio server 1520E. The watermark is designated "M'" instead of "M" to indicate that the watermark M' has gone through the hardware audio processor. Because the watermark is not a conventional audio signal, the effect the hardware audio processor 1510E may have on it may be different from the effect that the hardware audio processor 1510E has on the other audio samples. That is, the watermark M' may be "processed" in some way, but will still be recognizable as a watermark as compared to the other processed audio samples by the audio server 1520E. The audio server 1520E in FIG. 15E has also received processed audio sample S5'. The discarding component 1527E of the audio server 1520E is shown using the watermark, discarding it, and successfully identifying S5' as the first audio sample to be processed.

The discarding of the watermark M' facilitates the start of the playback of processed audio samples once they are sent to the client program 1530E by rectifying any lack of synchronization between the end of the playback of unprocessed audio samples S0-S4 and the beginning of the playback of processed audio samples S5' and subsequent samples. The unprocessed audio and processed audio may not be synchronized because at the beginning of the process, while unprocessed early playback (of the unprocessed samples S0-S4) starts, unprocessed audio samples S5, S6, and so on, start to arrive at the audio server 1520E and are sent to the hardware audio processor 1510E through an A/D conversion as described earlier in the disclosure. Similarly, processed audio samples from S5' on are received from the hardware audio processor 1510E through a D/A conversion. These two processes might not be synchronized. Thus, D/A conversion must begin earlier than A/D conversion to ensure that no samples are lost. This early D/A conversion may lead to unwanted samples (i.e., the samples marked "0" in FIGS. 15C and 15D) on the input D/A buffer due to sampling that precedes the real client audio data (S5' and subsequent samples). If the unwanted "0" samples were to be played through the client program 1530E, an undesirable popping or crackling noise would be audible. Such a noise might occur in between the early playback samples of unprocessed audio S0-S4 and the processed samples S5' and on. Even in embodiments where no early playback of unprocessed samples was to take place, unwanted noise might still precede the playback of processed audio samples. The audio watermark or predetermined signal mitigates the unwanted noise because it is placed ahead of the unprocessed sample S5 in the A/D buffer when playback starts. As previously described, the watermark M goes through the hardware audio processor and the resulting processed marker M' is then present at the D/A converter of the audio server. The D/A conversion process itself throws away all samples 0 until it finds the watermark M'. After the processed watermark M' is detected and thrown away as well, the subsequent samples can reliably be sent back to the client plugin 1530E as an accurate representation of the start of the processed waveform and can be seamlessly attached to early playback samples S0-S4 for uninterrupted playback that transitions from unprocessed to processed.

Figure 15F:
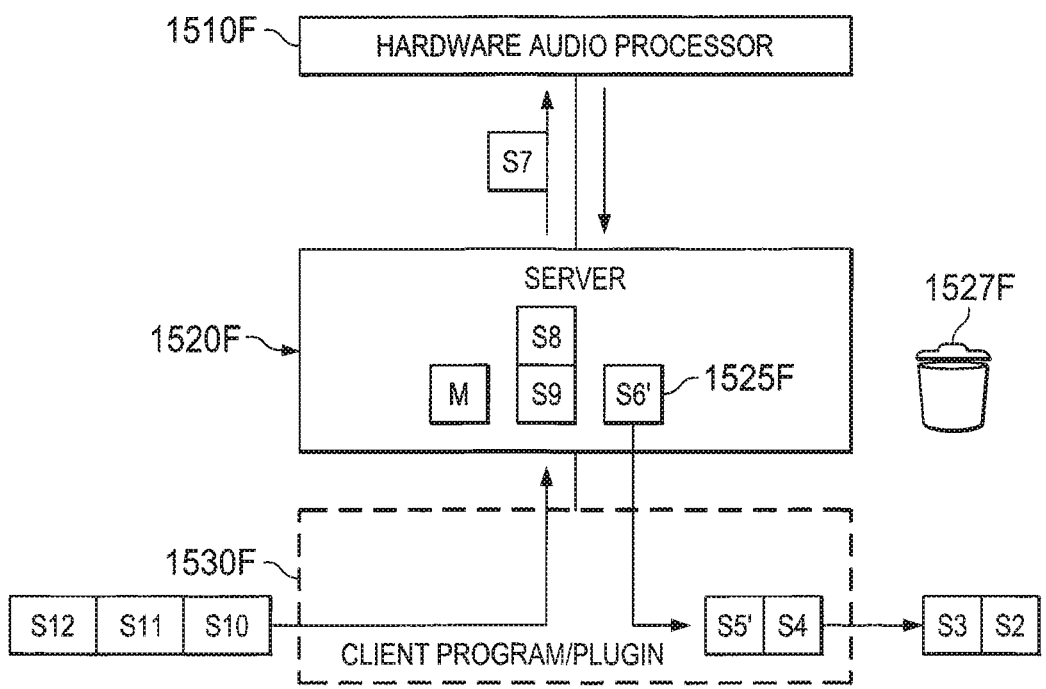

FIG. 15F shows that when the processed samples S5' and onward arrive at the client, they are appended to the existing early playback buffer of samples, right behind sample S4 at the client program 1530F. When early playback expires, the system will seamlessly continue with the subsequent processed samples that are now streaming into the client program 1530F.

It is expected that the hardware audio processors of the present disclosure may employ tubes and other analog components that may deteriorate over time. When this deterioration reaches a level where it impacts the integrity of the audio going through the unit, the components in the hardware audio processor may need to be manually replaced. It is possible that it could be difficult to determine precisely when this threshold of deterioration would be reached. To manage this, a maintenance task or program may be implemented on the audio server. This program would run known test signals, such as sine waves, through the equipment and record the resulting processed test signals at the output of the hardware audio processor. These tests could be done multiple times with different control settings on the hardware audio processor front panel. These recorded test signals would then be compared against recorded test waves from units that are known to be in good working state without deterioration. If the comparison showed that the test signals were sufficiently different from the stored known good recordings, the server could alert a system administrator that component replacement was necessary.

Figure 16:
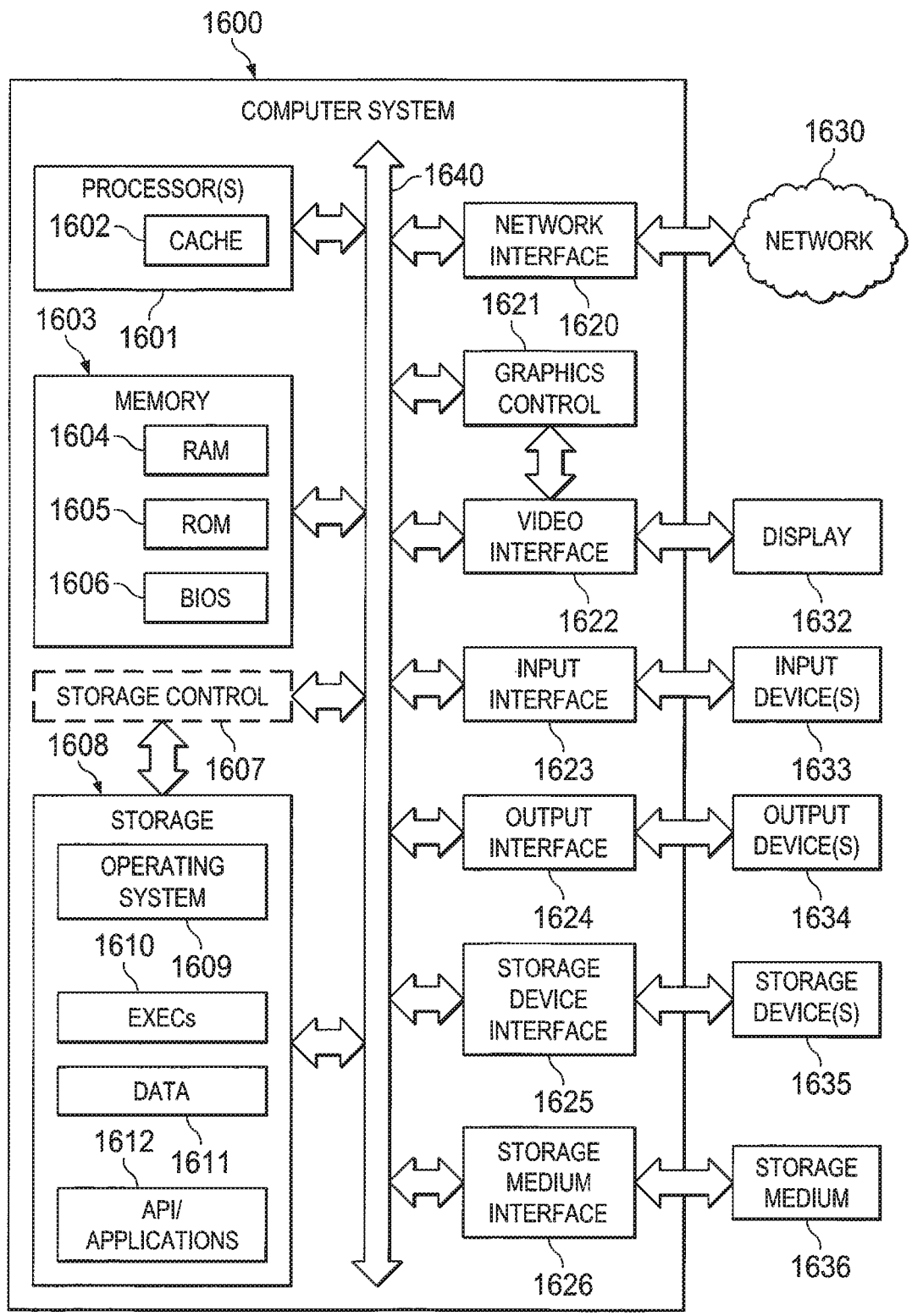
FIG. 16 is a high-level computer diagram that may implement aspects of the present disclosure.

In addition to the specific physical devices described herein. FIG. 16 shows a diagrammatic representation of one embodiment of a computer system 1600 within which a set of instructions can execute for causing a device to perform or execute any one or more of the aspects and/or methodologies of the present disclosure. The client 101, alone or in conjunction with the server 150 FIG. 1 is one implementation of the computer system 1600. The server 250 in conjunction with the D/A and A/D converter 230, 280 of FIG. 2 and/or the robotic control hardware 340 of FIG. 3 are another implementation of the computer system 1600. The components in FIG. 16 are examples only and do not limit the scope of use or functionality of any hardware, software, firmware, embedded logic component, or a combination of two or more such components implementing particular embodiments of this disclosure. Some or all of the illustrated components can be part of the computer system 1600. For instance, the computer system 1600 can be a general-purpose computer (e.g., a laptop computer) or an embedded logic device (e.g., an FPGA), to name just two non-limiting examples.

Computer system 1600 includes at least a processor 1601 such as a central processing unit (CPU) or an FPGA to name two non-limiting examples. The computer system 1600 may also comprise a memory 1603 and a storage 1608, both communicating with each other, and with other components, via a bus 1640. The bus 1640 may also link a display 1632, one or more input devices 1633 (which may, for example, include a keypad, a keyboard, a mouse, a stylus, etc.), one or more output devices 1634, one or more storage devices 1635, and various non-transitory, tangible computer-readable storage media 1636 with each other and with one or more of the processor 1601, the memory 1603, and the storage 1608. All of these elements may interface directly or via one or more interfaces or adaptors to the bus 1640. For instance, the various non-transitory, tangible computer-readable storage media 1636 can interface with the bus 1640 via storage medium interface 1626. Computer system 1600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 1601 (or central processing unit(s) (CPU(s))) optionally contains a cache memory unit 1602 for temporary local storage of instructions, data, or computer addresses. Processor(s) 1601 are configured to assist in execution of computer-readable instructions stored on at least one non-transitory, tangible computer-readable storage medium. Computer system 1600 may provide functionality as a result of the processor(s) 1601 executing software embodied in one or more non-transitory, tangible computer-readable storage media, such as memory 1603, storage 1608, storage devices 1635, and/or storage medium 1636 (e.g., read only memory (ROM)). For instance, the method described throughout the disclosure may be embodied in one or more non-transitory, tangible computer-readable storage media. The non-transitory, tangible computer-readable storage media may store software that implements particular embodiments, and processor(s) 1601 may execute the software. Memory 1603 may read the software from one or more other non-transitory, tangible computer-readable storage media (such as mass storage device(s) 1635, 1636) or from one or more other sources through a suitable interface, such as network interface 1620. The software may cause processor(s) 1601 to carry out one or more processes or one or more steps of one or more processes described or illustrated herein. Carrying out such processes or steps may include defining data structures stored in memory 1603 and modifying the data structures as directed by the software. In some embodiments, an FPGA can store instructions for carrying out functionality as described in this disclosure. In other embodiments, firmware includes instructions for carrying out functionality as described in this disclosure.

The memory 1603 may include various components (e.g., non-transitory, tangible computer-readable storage media) including, but not limited to, a random access memory component (e.g., RAM 1604) (e.g., a static RAM "SRAM", a dynamic RAM "DRAM, etc.), a read-only component (e.g., ROM 1605), and any combinations thereof. ROM 1605 may act to communicate data and instructions unidirectionally to processor(s) 1601, and RAM 1604 may act to communicate data and instructions bidirectionally with processor(s) 1601. ROM 1605 and RAM 1604 may include any suitable non-transitory, tangible computer-readable storage media described below. In some instances, ROM 1605 and RAM 1604 include non-transitory, tangible computer-readable storage media for carrying out the methods described throughout the disclosure. As one example, a basic input/output system 1606 (BIOS), including basic routines that help to transfer information between elements within computer system 1600, such as during start-up, may be stored in the memory 1603.

Fixed storage 1608 is connected bidirectionally to processor(s) 1601, optionally through storage control unit 1607. Fixed storage 1608 provides additional data storage capacity and may also include any suitable non-transitory, tangible computer-readable media described herein. Storage 1608 may be used to store operating system 1609, EXECs 1610 (executables), data 1611, API applications 1612 (application programs), and the like. For instance, the storage 1608 could be implemented for storage of received audio data described with reference to FIG. 1. Often, although not always, storage 1608 is a secondary storage medium (such as a hard disk) that is slower than primary storage (e.g., memory 1603). Storage 1608 can also include an optical disk drive, a solid-state memory device (e.g., flash-based systems), or a combination of any of the above. Information in storage 1608 may, in appropriate cases, be incorporated as virtual memory in memory 1603.

In one example, storage device(s) 1635 may be removably interfaced with computer system 1600 (e.g., via an external port connector (not shown)) via a storage device interface 1625. Particularly, storage device(s) 1635 and an associated machine-readable medium may provide nonvolatile and/or volatile storage of machine-readable instructions, data structures, program modules, and/or other data for the computer system 1600. In one example, software may reside, completely or partially, within a machine-readable medium on storage device(s) 1635. In another example, software may reside, completely or partially, within processor(s) 1601.

Bus 1640 connects a wide variety of subsystems. Herein, reference to a bus may encompass one or more digital signal lines serving a common function, where appropriate. Bus 1640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1600 may also include an input device 1633. In one example, a user of computer system 1600 may enter commands and/or other information into computer system 1600 via input device(s) 1633. Examples of an input device(s) 1633 include, but are not limited to, an alphanumeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1633 may be interfaced to bus 1640 via any of a variety of input interfaces 1623 (e.g., input interface 1623) including, but not limited to, serial, parallel, game port, USB, FIREWIRE, THUNDERBOLT, or any combination of the above.

In particular embodiments, when computer system 1600 is connected to network 1630, computer system 1600 may communicate with other devices, such as mobile devices and enterprise systems, connected to network 1630. Communications to and from computer system 1600 may be sent through network interface 1620. For example, network interface 1620 may receive incoming communications (such as requests or responses from other devices) in the form of one or more packets (such as Internet Protocol (IP) packets) from network 1630, and computer system 1600 may store the incoming communications in memory 1603 for processing. Computer system 1600 may similarly store outgoing communications (such as requests or responses to other devices) in the form of one or more packets in memory 1603 and communicated to network 1630 from network interface 1620. Processor(s) 1601 may access these communication packets stored in memory 1603 for processing.

Examples of the network interface 1620 include, but are not limited to, a network interface card, a modem, and any combination thereof. Examples of a network 1630 or network segment 1630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. For instance, the network comprising the clients 101-103, the internet 110, and the server 150 is one exemplary implementation of the network 1630. A network, such as network 1630, may employ a wired and/or a wireless mode of communication, including Ethernet, Wi-Fi, Bluetooth, ZigBee, EnOcean or any other short or long range communication protocol. In general, any network topology may be used.

Information and data can be displayed through a display 1632. Examples of a display 1632 include, but are not limited to, a liquid crystal display (LCD), an organic liquid crystal display (OLED), a cathode ray tube (CRT), a plasma display, and any combinations thereof. The display 1632 can interface to the processor(s) 1601, memory 1603, and fixed storage 1608, as well as other devices, such as input device(s) 1633, via the bus 1640. The display 1632 is linked to the bus 1640 via a video interface 1622, and transport of data between the display 1632 and the bus 1640 can be controlled via the graphics control 1621.

In addition to a display 1632, computer system 1600 may include one or more other peripheral output devices 1634 including, but not limited to, an audio speaker, a printer, and any combinations thereof. Such peripheral output devices may be connected to the bus 1640 via an output interface 1624. Examples of an output interface 1624 include, but are not limited to, a serial port, a parallel connection, a USB port, a FIREWIRE port, a THUNDERBOLT port, and any combinations thereof.

In addition, or as an alternative, computer system 1600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. The present disclosure encompasses any suitable combination of hardware, software, or both.

Figure 17:
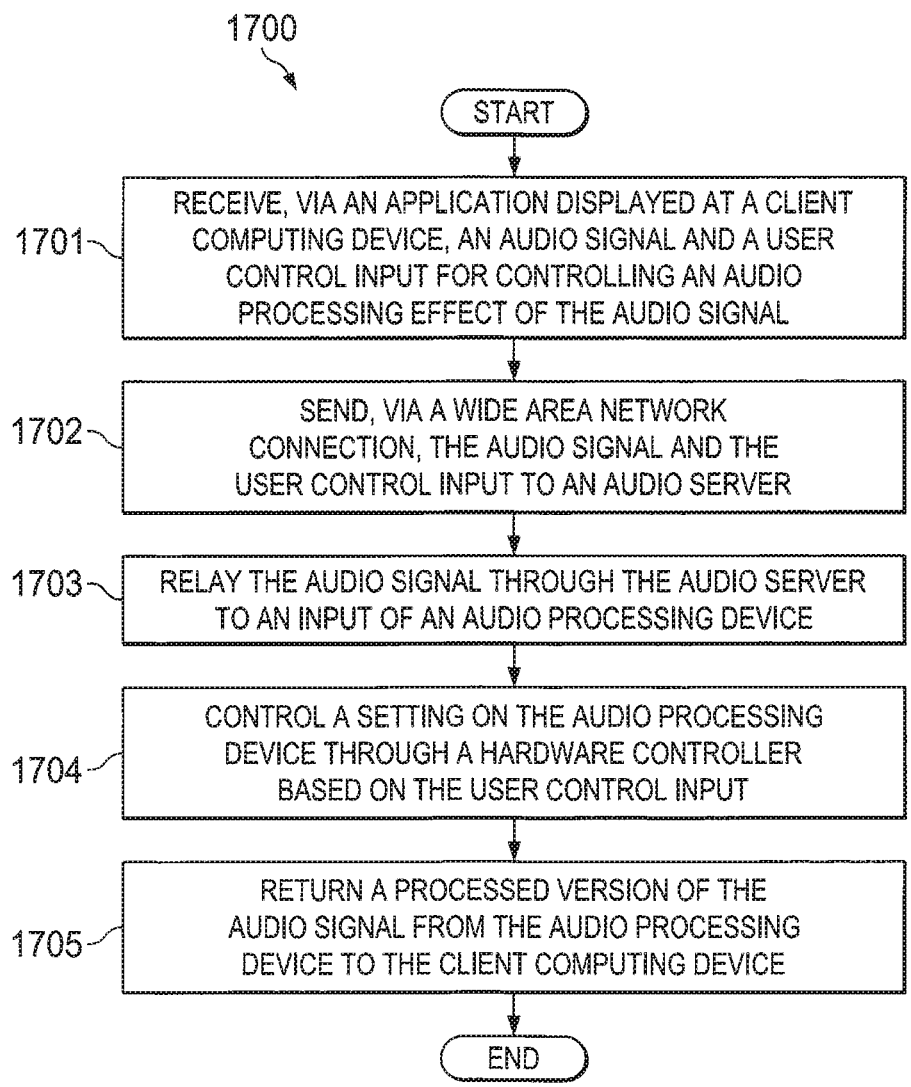
FIG. 17 is a flowchart of a method of the present disclosure.

FIG. 17 is a flowchart depicting a method 1700 for processing audio signals according to the present disclosure. The method may first comprise, at step 1701, receiving, via an application displayed at a client computing device, an audio signal and a user control input for controlling an audio processing effect of the audio signal. Then at step 1702, the method may comprise sending, via a wide area network connection, the audio signal and the user control input to an audio server. The method may further comprise, at step 1703, relaying the audio signal through the audio server to an input of an audio processing device, and at step 1704, controlling a setting on the audio processing device through a hardware controller based on the user control input. Finally, the method may comprise, at step 1705 returning a processed version of the audio signal from the audio processing device to the client computing device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and novel features disclosed herein.

What is claimed is:

1. A method for processing audio signals, the method comprising:
   receiving, via an application displayed at a client computing device, an audio signal and a user control input for controlling an audio processing effect of the audio signal;
   sending the audio signal and the user control input to an audio server;
   relaying the audio signal through the audio server to an input of an audio processing device,
   controlling a setting on the audio processing device through a hardware controller based on the user control input,
   returning a processed version of the audio signal from the audio processing device to the client computing device;
   initiating playback of an unprocessed version of the audio signal during a time period between the sending of the audio signal to the audio server and the returning of the processed version of the audio signal;
   adding an identifying signal in between samples of the unprocessed version of the audio signal;
   locating a first sample after the identifying signal in the processed version of the audio signal;
   discarding the identifying signal prior to playback of the processed version of the audio signal;
   terminating the playback of the unprocessed version of the audio signal; and
   initiating the playback of the processed version of the audio signal, wherein the terminating and the initiating are based on the locating of the first sample after the identifying signal.

2. The method of claim 1, wherein the audio signal is sent back to the client computing device in substantially real time.

3. The method of claim 1, further comprising:
   displaying, at the client computing device, a graphical user interface control panel having graphical controls representations corresponding to one or more physical controls on the audio processing device.

4. The method of claim 3, wherein the graphical user interface control panel has graphical control representations corresponding to each of the graphical controls of the audio processing device.

5. The method of claim 3, wherein the audio processing device comprises a visual audio meter and the graphical user interface control panel further comprises a graphical representation of the visual audio meter.

6. The method of claim 5, further comprising:
   recording, with an image capture device, the visual audio meter; and
   displaying an image of the visual audio meter on the graphical user interface control panel.

7. The method of claim 6, wherein the image is a graphical rendering of the visual audio meter.

8. The method of claim 1, wherein the adding of the identifying signal and the discarding of the identifying symbol are performed at the audio server.

9. The method of claim 1, further comprising:
   presenting, to a user, at the client computing device, an equipment selection interface configured to allow the user to reserve the audio processing device.

10. The method of claim 9, further comprising:
    scheduling, in a database, a time reserved by the user for using the audio processing device; and
    initiating, by the audio server, the relaying of the audio signal to the processing device based on the scheduling in the database, and
    terminating, based on the scheduling in the database, the returning of the processed version of the audio signal.

11. The method of claim 1, wherein the audio signal comprises a plurality of audio samples and further comprising:
    delaying, at the audio server, the relaying of the plurality of audio samples to the input of the audio processing device to create a first buffer queue of the plurality of audio samples,
    delaying, at an input to the client computing device, the returning of the processed version of the audio signal to create a second buffer queue of the plurality of audio samples.

12. A method for remotely using audio processing devices, the method comprising:
    presenting, to a user, at a client computing device, an equipment selection interface configured to allow the user to select one of a plurality of remote audio processing devices, receiving, via an application displayed at the client computing device, an audio signal and a user control input for controlling an audio processing effect of the audio signal;
sending the audio signal and the user control input to an audio server;
relaying the audio signal through the audio server to an input of a selected audio processing device;
controlling a setting on the selected audio processing device through a hardware controller based on the user control input;
returning a processed version of the audio signal from the selected audio processing device to the client computing device;
initiating playback of an unprocessed version of the audio signal during a time period between the sending of the audio signal to the audio server and the returning of the processed version of the audio signal;
adding an identifying signal in between samples of the unprocessed version of the audio signal;
locating a first sample after the identifying signal in the processed version of the audio signal;
discarding the identifying signal prior to playback of the processed version of the audio signal;
terminating the playback of the unprocessed version of the audio signal; and
initiating the playback of the processed version of the audio signal, wherein the terminating and the initiating are based on the locating of the first sample after the identifying signal.

13. The method of claim 12, further comprising:
saving a level of a particular setting on the selected audio processing device at an end time of the user using the selected audio processing device; and
returning the particular setting to the level at a subsequent time the user uses the same selected audio processing device.

14. The method of claim 13, wherein the user is a first user, and further comprising:
reserving, for a second user, the selected audio processing device;
processing a second audio signal for the second user by the selected processing device;
wherein the first user, the second user, and the selected audio processing device are each in different remote geographical locations.

15. A system for remote access to an audio processing device, the system comprising:
an audio server configured to:
receive, via an application displayed at a client computing device, an audio signal and a user control input for controlling an audio processing effect of the audio signal;
send the audio signal and the user control input to an audio server;
relay the audio signal through the audio server to an input of an audio processing device,
control a setting on the audio device through a hardware controller based on the user control input, and
return a processed version of the audio signal from the audio processing device to the client computing device;
initiate playback of an unprocessed version of the audio signal during a time period between the sending of the audio signal to the audio server and the returning of the processed version of the audio signal;
add an identifying signal in between samples of the unprocessed version of the audio signal;
locate a first sample after the identifying signal in the processed version of the audio signal;
discard the identifying signal prior to playback of the processed version of the audio signal;
terminate the playback of the unprocessed version of the audio signal; and
initiate the playback of the processed version of the audio signal, wherein the terminating and the initiating are based on the locating of the first sample after the identifying signal;
and
a web server configured to:
present, to a user, at the client computing device, an equipment selection interface configured to allow the user to reserve the audio processing device; and
schedule a time reserved by the user for using the audio processing device.

16. The system of claim 15, further comprising:
a plurality of audio processing devices.

17. The system of claim 15, wherein the web server us further configured to:
display, at the client computing device, a graphical user interface control panel having graphical controls representations corresponding to one or more physical controls on the audio processing device.

18. The system of claim 17, further comprising:
the hardware controller, wherein the hardware controller comprises one or more physical control interfaces with the audio processing device.

19. The system of claim 18, further comprising:
an image capture device arranged to capture an image of the physical control interface of the audio processing device.

20. The system of claim 17, further comprising:
one or more databases, and wherein the web server and audio server are configured to access the one or more databases to schedule and use one or more of the plurality of audio processing devices.

21. The system of claim 20, wherein the one or more databases comprise a scheduling database and a parameter database.

* * * * *